(12) United States Patent
Nomura et al.

(10) Patent No.: US 7,536,091 B2
(45) Date of Patent: May 19, 2009

(54) IMAGE STABILIZER

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 467 days.

(21) Appl. No.: 11/539,369

(22) Filed: Oct. 6, 2006

(65) Prior Publication Data
US 2007/0081806 A1    Apr. 12, 2007

(30) Foreign Application Priority Data
Oct. 7, 2005 (JP) ............ P2005-295657
Oct. 2, 2006 (JP) ............ P2006-270603

(51) Int. Cl.
G03B 17/00   (2006.01)
(52) U.S. Cl. .............. 396/55; 396/52; 348/208.4; 348/208.11; 359/554; 359/557
(58) Field of Classification Search .......... 396/52, 396/55; 348/208.4, 208.7, 208.11, 219.1; 359/554–557; 33/1 M
See application file for complete search history.

(56) References Cited

U.S. PATENT DOCUMENTS

| | | | | |
|---|---|---|---|---|
| 4,780,739 A | * | 10/1988 | Kawakami et al. | 396/54 |
| 4,864,339 A | * | 9/1989 | Gross et al. | 396/52 |
| 5,172,276 A | * | 12/1992 | Ueyama et al. | 359/813 |
| 5,181,056 A | * | 1/1993 | Noguchi et al. | 396/55 |
| 5,266,988 A | * | 11/1993 | Washisu | 396/55 |
| 5,335,032 A | * | 8/1994 | Onuki et al. | 396/50 |
| 5,398,132 A | * | 3/1995 | Otani | 359/557 |
| 5,774,266 A | * | 6/1998 | Otani et al. | 359/554 |
| 5,825,545 A | * | 10/1998 | Kino et al. | 359/557 |

(Continued)

FOREIGN PATENT DOCUMENTS

| | | |
|---|---|---|
| JP | 05-100280 | 4/1993 |
| JP | 08-76165 | 3/1996 |
| JP | 2006-98531 | 4/2006 |

OTHER PUBLICATIONS

U.S. Appl. No. 11/477,456 to Nomura et al., which was filed on Jun. 30, 2006.

(Continued)

*Primary Examiner*—Kenneth J Whittington
*Assistant Examiner*—Warren K Fenwick
(74) *Attorney, Agent, or Firm*—Greenblum & Bernstein, P.L.C.

(57) ABSTRACT

An image stabilizer includes a guide device which guides an image-stabilizing optical element in a manner to allow the image-stabilizing optical element to move in a plane orthogonal to an optical axis, the guide device including at least one mechanical movement limit preventing movement of the image-stabilizing optical element in a guide direction; a driving device which moves the image-stabilizing optical element in the plane; and a drive controller which controls the driving device to move the image-stabilizing optical element within an image-stabilizing movement range so as not to reach the mechanical movement limit for correction of image shake during an image stabilizing operation, and which controls the driving device to move the image-stabilizing optical element to a standby position located outside of the image-stabilizing movement range in the guide direction, when the image stabilizer changes from an operating state to a non-operating state.

10 Claims, 29 Drawing Sheets

U.S. PATENT DOCUMENTS

| | | |
|---|---|---|
| 6,208,377 B1 * | 3/2001 | Morofuji et al. ......... 348/208.8 |
| 6,295,412 B1 | 9/2001 | Katano et al. .................. 396/55 |
| 2006/0077260 A1 * | 4/2006 | Pyo et al. .................. 348/208.7 |
| 2006/0115251 A1 | 6/2006 | Nomura ........................ 396/55 |
| 2006/0115254 A1 | 6/2006 | Nomura ........................ 396/55 |
| 2006/0115256 A1 | 6/2006 | Nomura ........................ 396/55 |
| 2006/0115257 A1 | 6/2006 | Nomura ........................ 396/55 |
| 2006/0115258 A1 | 6/2006 | Nomura ........................ 396/55 |
| 2006/0170388 A1 | 8/2006 | Nomura et al. ............. 318/685 |

OTHER PUBLICATIONS

U.S. Appl. No. 11/477,499 to Nomura et al., which was filed on Jun. 30, 2006.
U.S. Appl. No. 11/477,380 to Nomura et al., which was filed on Jun. 30, 2006.
English Language Abstract of JP 05-100280.
English Language Abstract of JP 08-76165.
English Language Abstract of JP 2006-98531.

* cited by examiner

IMAGE STABILIZER

BACKGROUND OF THE INVENTION

1. Field of the Invention

The present invention relates to an image stabilizer which is incorporated in an optical device such as a camera or binoculars.

2. Description of the Related Art

Optical image stabilizers (shake reduction systems/anti-shake systems) prevent (reduce) image shake of an object image formed at a focal plane by moving a part of an optical system relative to an optical axis thereof so that the part of the optical system shifts from the optical axis in accordance with the direction and the magnitude of vibration (shake) applied to the optical device in which the image stabilizer is incorporated. Such optical image stabilizers can be broadly divided into two types: a type of image stabilizer which swings an image-stabilizing optical element about an axis positioned away from the optical axis of the optical system, and another type (X-Y stage type) of image stabilizer which moves an image-stabilizing optical element in two directions orthogonal to each other. The latter type has the advantage that the image stabilizing optical element can be moved precisely in directions to cancel image shake; however, since there is a possibility of the driving mechanism for the image-stabilizing optical element becoming damaged when the optical device in which the image stabilizer is incorporated is not in use if the image-stabilizing optical element accidentally moves, the image stabilizer is usually provided with a lock device for the image-stabilizing optical element. As examples of such a lock device, two types of lock devices are known in the art: an electrical lock device which continuously supplies a driving signal to a drive source having a motor and/or an actuator to hold the image-stabilizing optical element at a predetermined position, and a mechanical lock device which mechanically locks the image-stabilizing optical element. The former lock device is seldom used because it consumes a large amount of power, which is unsuitable especially for an optical device using battery as a power source. An example of the latter lock device has been proposed in, e.g., Japanese unexamined patent publication H05-100280. This mechanical lock device is provided with a lock mechanism which is actuated in association with the motion of a retractable lens barrel between the fully retracted state and a ready-to-photograph state thereof. However, this conventional mechanical lock device requires such a lock mechanism to be provided as a separate mechanism, which becomes a cause of an increase in size of the image stabilizer.

SUMMARY OF THE INVENTION

The present invention provides an optical image stabilizer in which the image stabilizing optical element can be held with stability by a simple structure without incurring an increase in size of the image stabilizer when the optical device, in which the image stabilizer is incorporated, is not in use.

According to an aspect of the present invention, an image stabilizer is provided, including a guide device which guides an image-stabilizing optical element in a manner to allow the image-stabilizing optical element to move in a plane orthogonal to an optical axis, the guide device including at least one mechanical movement limit which prevents movement of the image-stabilizing optical element in a guide direction; a driving device which moves the image-stabilizing optical element in the plane; and a drive controller which controls the driving device to move the image-stabilizing optical element within an image-stabilizing movement range so as not to reach the mechanical movement limit for correction of image shake during an image stabilizing operation, and which controls the driving device to move the image-stabilizing optical element to a standby position located outside of the image-stabilizing movement range in said guide direction, when the image stabilizer changes from an operating state to a non-operating state.

It is desirable for the standby position of the image-stabilizing optical element to correspond to the mechanical movement limit.

It is desirable for the standby position of the image-stabilizing optical element to be adjacent to the mechanical movement limit so as to be located closer to the mechanical movement limit than the image-stabilizing movement range.

It is desirable for the image stabilizer to include a biasing device which biases the image-stabilizing optical element in one of opposite directions of movement thereof in the plane. The drive controller moves the image-stabilizing optical element to the standby position in a direction opposite to a biasing direction of the biasing device when the image stabilizer changes from the operating state to the non-operating state.

It is desirable for the driving device to include a drive source; a first moving member which is movable along a guide direction of the guide device by the drive source; a second moving member which is guided along the guide direction and movable relative to the first moving member, wherein the second moving member applies a moving force to the image-stabilizing optical element; and a second biasing device which biases the second moving member in a direction opposite to the biasing direction of the biasing device with a biasing force greater than a biasing force of the biasing device.

It is desirable for the guide device to include a first moving stage supported by a stationary member thereon to be movable linearly in a first direction in a plane which is orthogonal to the optical axis; and a second moving stage supported by the first moving stage thereon to be movable linearly in a second direction orthogonal to the first direction in a plane which is orthogonal to the optical axis, wherein the image-stabilizing optical element is mounted on the second moving stage. The driving device includes a first driving device which moves the first moving stage forward and reverse in the first direction; and a second driving device which moves the second moving stage forward and reverse in the second direction. The drive controller moves the first moving stage and the second moving stage to respective standby positions thereof so that the image-stabilizing optical element is positioned at the standby position thereof.

It is desirable for the image stabilizer to include a memory in which standby position drive data indicating an amount of driving of the image-stabilizing optical element to the standby position by the driving device is stored. The drive controller moves the image-stabilizing optical element via the driving device based on the standby position drive data read out from the memory when the image stabilizer changes from the operating state to the non-operating state.

It is desirable for the driving device to include a stepping motor, and for the standby position drive data to include pulse data for the stepping motor.

It is desirable for the image stabilizer to be incorporated in a digital camera, and for the image-stabilizing optical element to include one of an image pickup device and a lens group.

In an embodiment, an image stabilizer is provided, including an image-stabilizing optical element which is movable in a plane orthogonal to an optical axis within a mechanical operating range of movement; and a driving device which moves the image-stabilizing optical element in accordance with a driving signal for correction of image shake in the plane within a middle range of movement for correction of image shake which is defined within the mechanical operating range of movement by the driving signal. The driving device is controlled to move the image-stabilizing optical element to a standby position which is located outside of the middle range of movement for correction of image shake and which is closer to one of opposite ends of the mechanical operating range of movement than the middle range of movement for correction of image shake when the image stabilizer changes from a ready-to-photograph state to a non-photograph state.

The present disclosure relates to subject matter contained in Japanese Patent Applications Nos. 2005-295657 (filed on Oct. 7, 2005) and 2006-270603 (filed on Oct. 2, 2006), which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
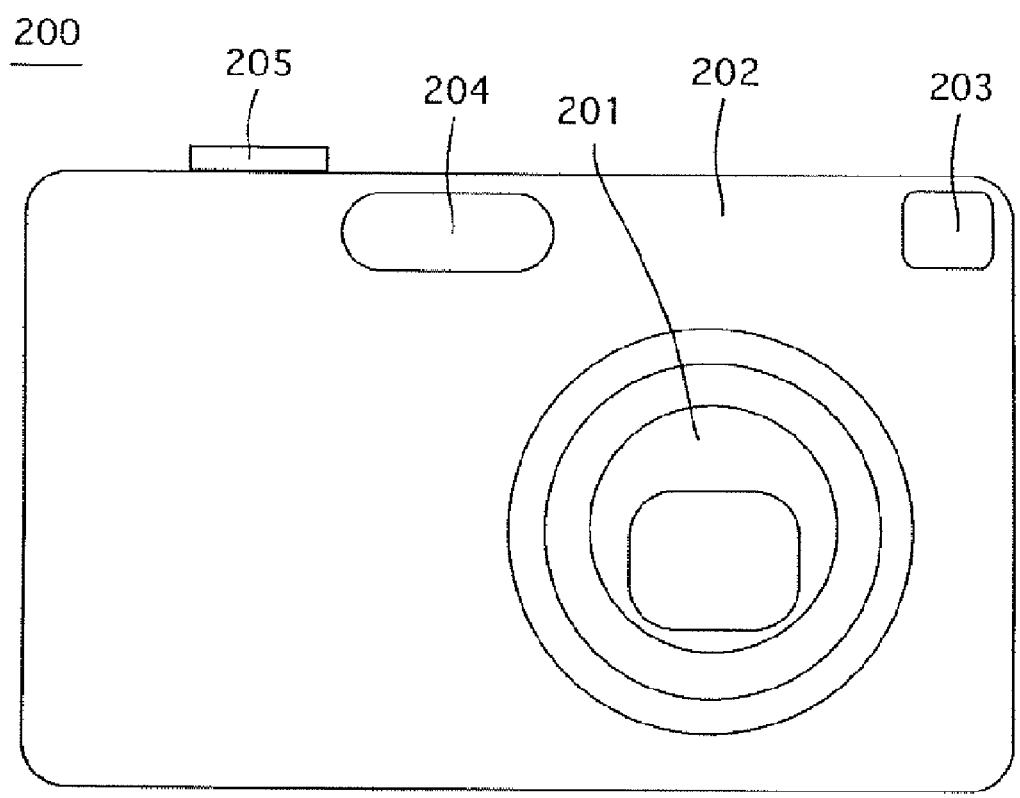
FIG. 1 is a front elevational view of an embodiment of a digital camera equipped with an image stabilizer according to the present invention.

FIG. 1 shows an outward appearance of a digital camera 200 which is equipped with an image stabilizer according to the present invention. The digital camera 200 is provided on the front of a camera body 202 thereof with a zoom lens (zoom lens barrel) 201, an optical viewfinder 203 and a flash 204, and is provided on the top of the camera body 202 with a shutter button 205.

Figure 2:
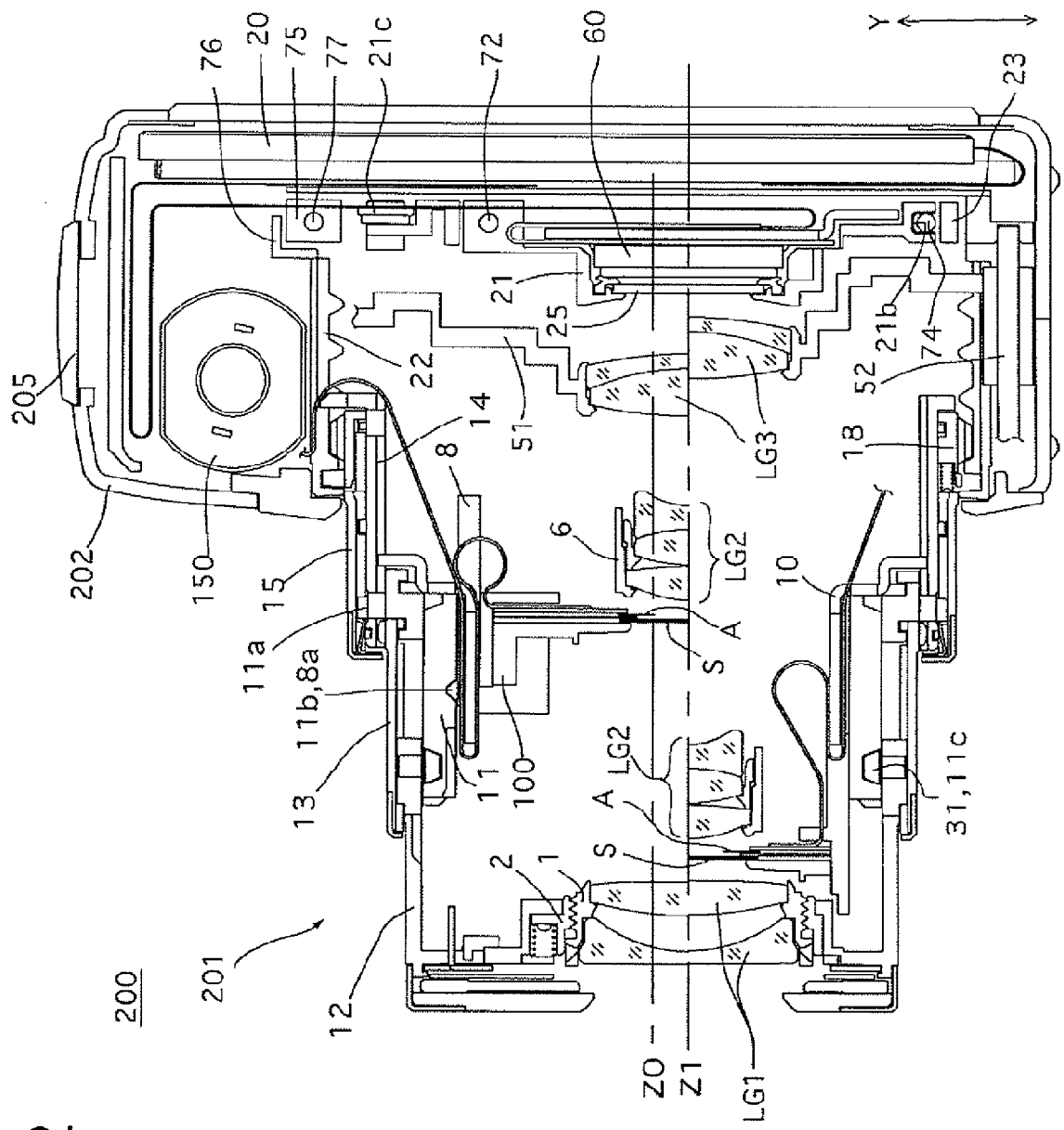
FIG. 2 is a longitudinal sectional view of the digital camera shown in FIG. 1 in a ready-to-photograph state of the zoom lens thereof.
Figure 3:
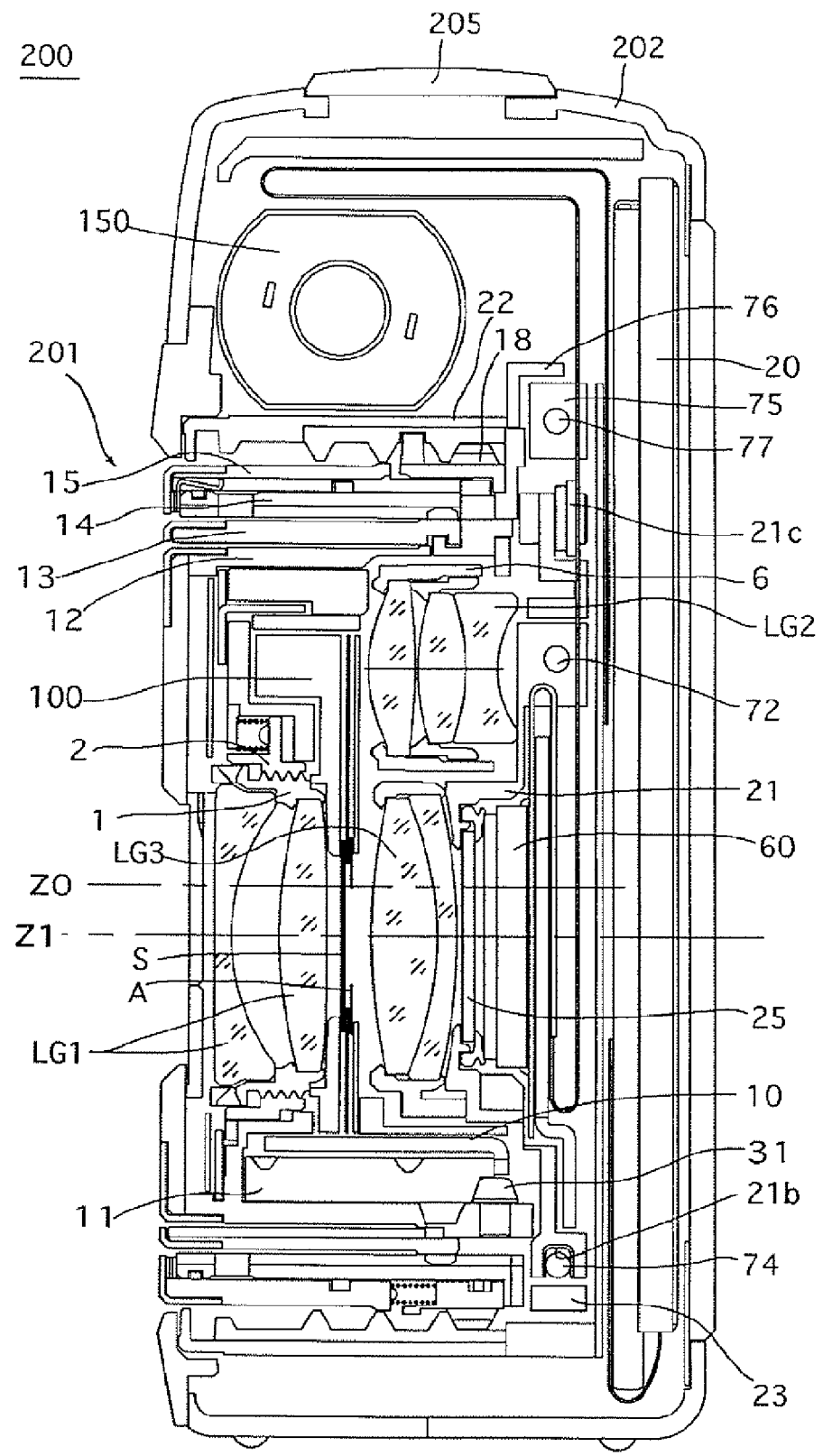
FIG. 3 is a longitudinal sectional view of the digital camera shown in FIG. 1 in the fully-retracted state of the zoom lens.
Figure 5:
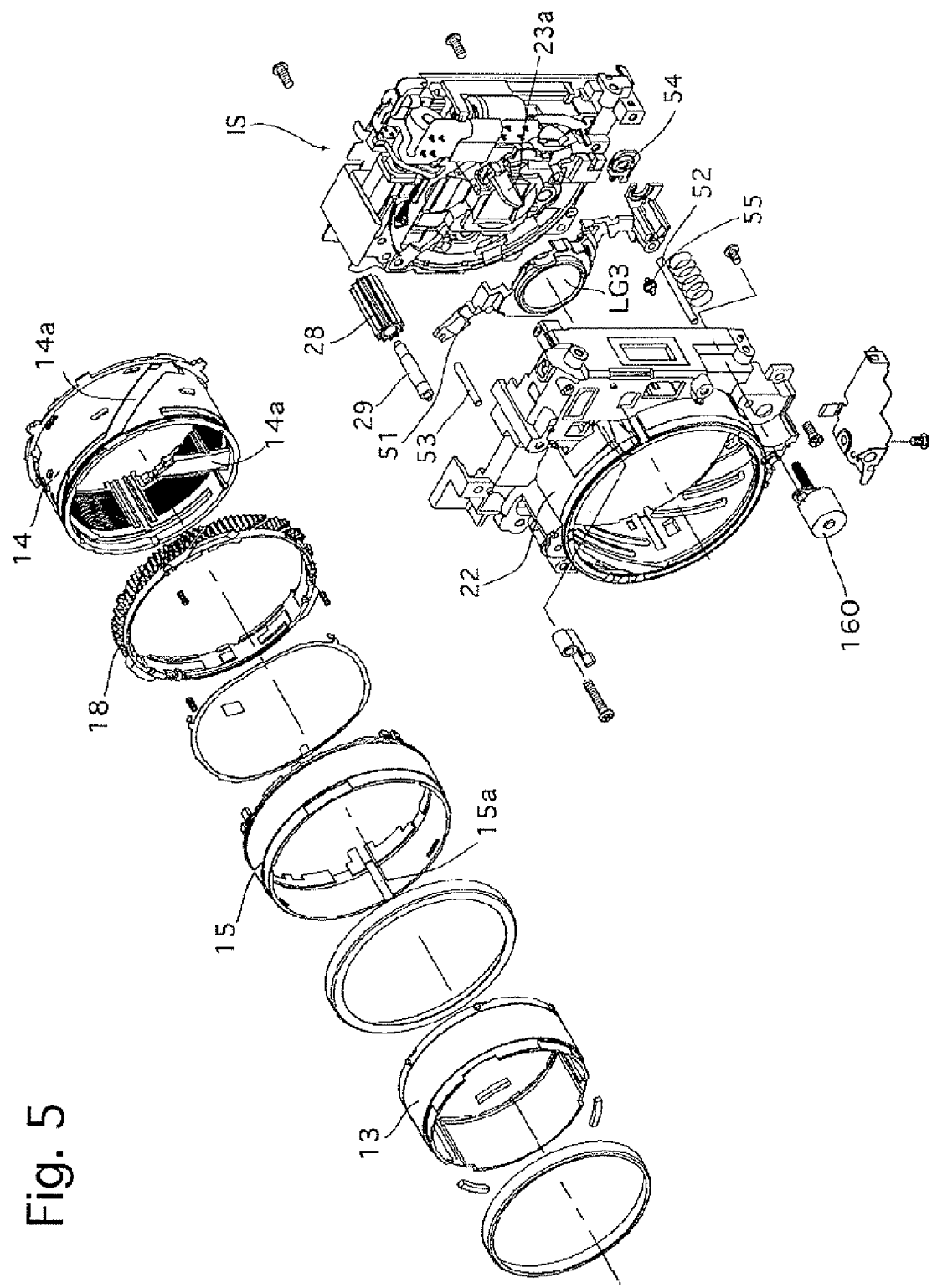
FIG. 5 is an exploded perspective view of a portion of the zoom lens shown in FIG. 4.
Figure 6:
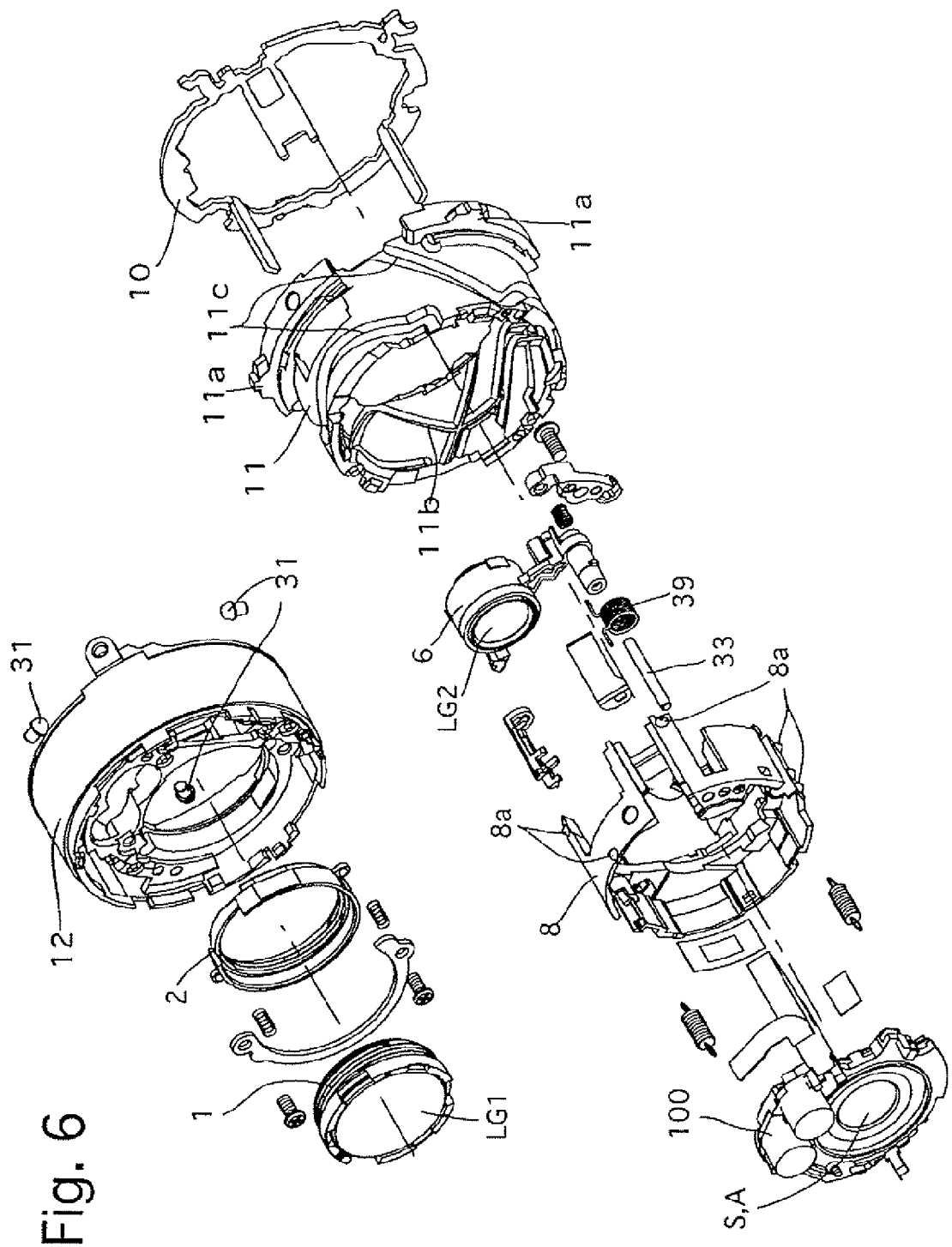
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward as viewed in FIGS. 2 and 3) from the camera body 202 as shown in FIG. 2 during a photographing operation. When photography is not being carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show a ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group LG2, a third lens group LG3, a low-pass filter 25 and a CCD image sensor (image-stabilizing optical element) 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 refer to a Y-direction and an X-direction, respectively.

The stationary barrel 22 is positioned in the camera body 202 and fixed thereto, while a stationary holder 23 is fixed to a rear portion of the stationary barrel 22. The CCD image sensor 60 and the low-pass filter 25 are supported by the stationary holder 23 via a Y-direction moving stage 71 and an X-direction moving stage 21 to be movable in the X-direction and the Y-direction. The digital camera 200 is provided behind the stationary holder 23 with an LCD panel 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55 (see FIG. 5). The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
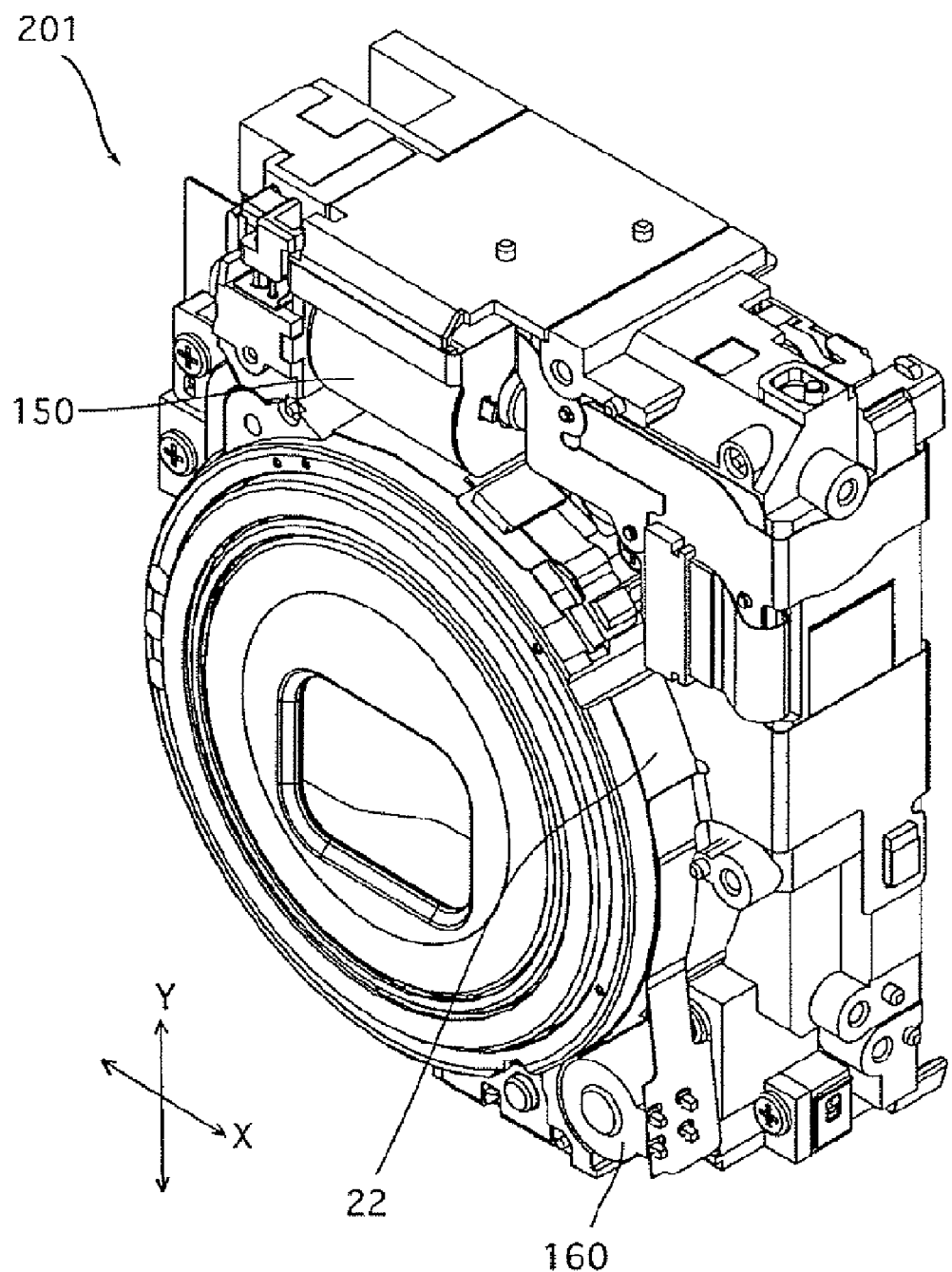
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity shown by the upper half of the zoom lens 201 in FIG. 2, In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined to the optical axis direction, while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 and the position in the state of the zoom lens 201 immediately before the zoom lens 201 enters the readyto-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 extending parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis Z1. The second lens frame 6 is biased to rotate in a direction toward the aforementioned photographing position of the second lens frame 6 by a torsion spring 39. The stationary holder 23 is provided with a position-control cam bar 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 202 being turned ON in the fully-retracted state of the zoom lens 201 shown in FIG. 3, the zoom motor 150 is driven to rotate in a lens barrel advancing direction by control of a control circuit (drive controller) 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. During this movement, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a with the set of three followers 11a of the cam ring 11, respectively. Once the helicoid ring 18 and the cam ring 11 advance to respective predetermined positions, the functions of a rotating/advancing mechanism (the aforementioned helicoid structure) between the helicoid ring 18 and the stationary barrel 22) and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, so that the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to a picture plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, and an axial position of the second lens group LG2 relative to the picture plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographing lens axis Z1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof. As can be seen from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have some space therebetween which is smaller than the space in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11, In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During this retracting movement of the zoom lens 201, the second lens frame 6 rotates about the pivot shaft 33 to the radially retracted position by the position-control cam bar 23a while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
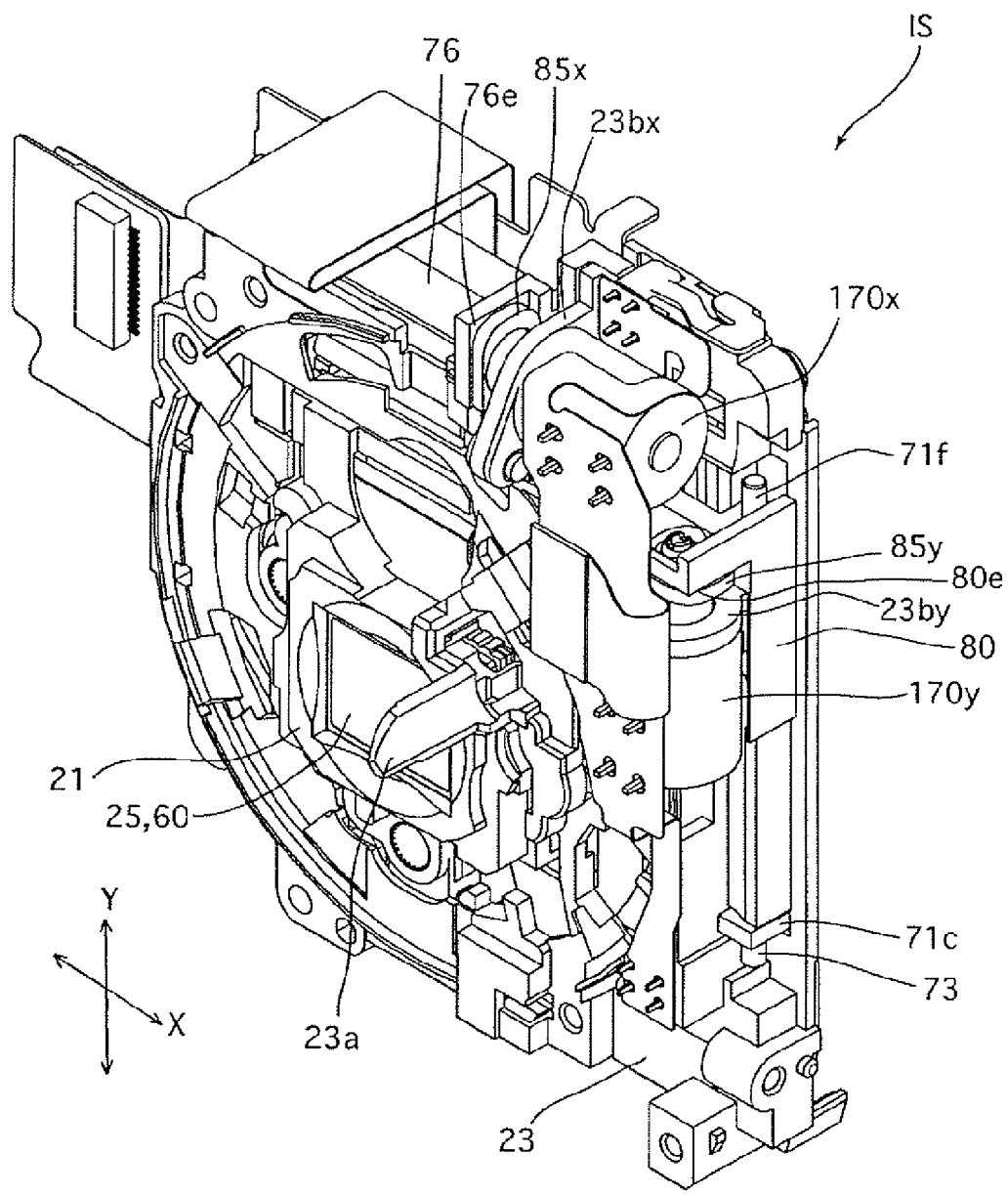
FIG. 7 is a front perspective view of an image stabilizing unit (image stabilizing mechanism) shown in FIG. 5.
Figure 8:
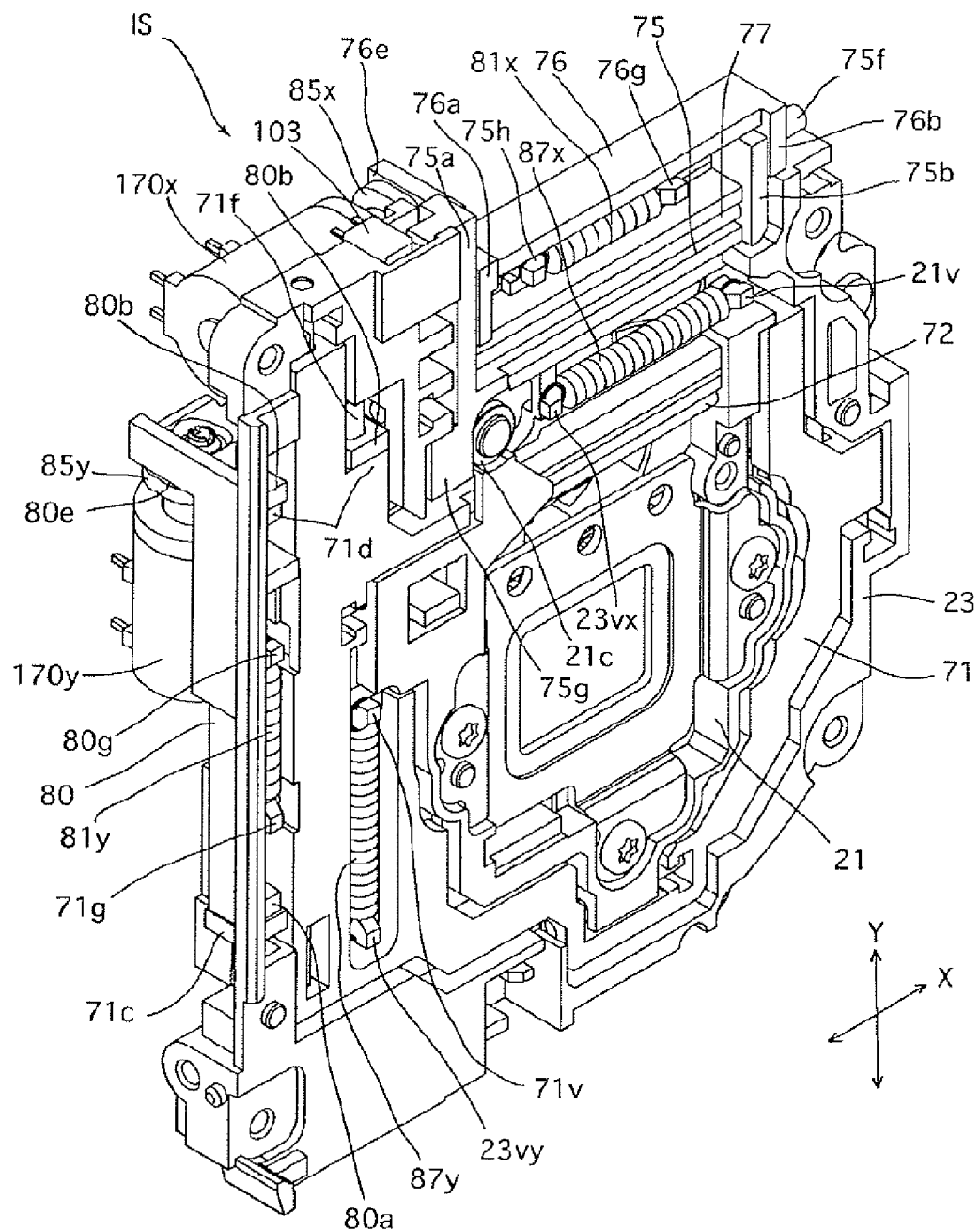
FIG. 8 is a rear perspective view of the image stabilizing unit shown in FIG. 5.
Figure 9:
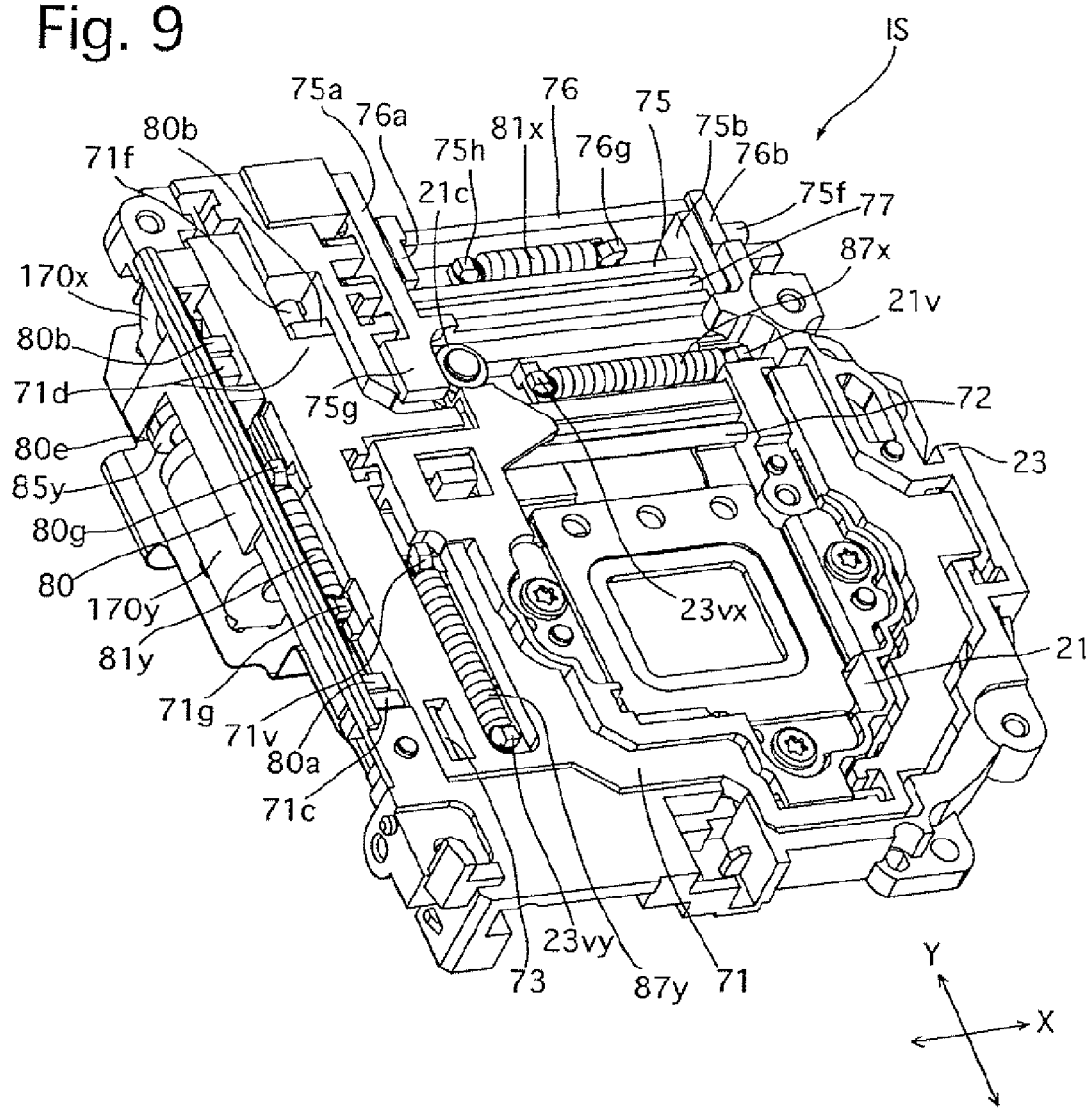
FIG. 9 is a rear perspective view of the image stabilizing unit shown in FIG. 5, viewed from an angle different from the angle of FIG. 8.
Figure 10:
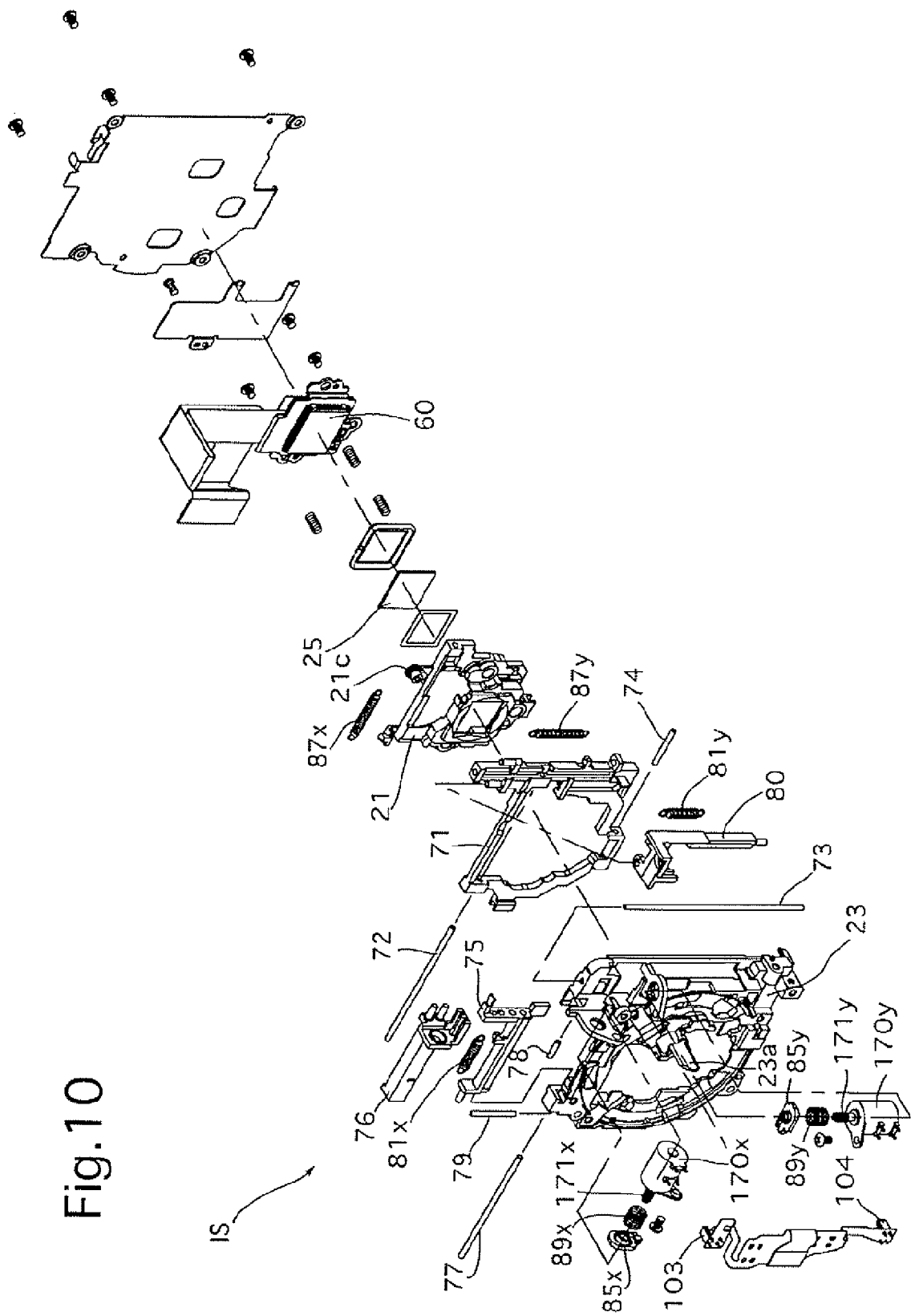
FIG. 10 is an exploded perspective view of the image stabilizing unit.
Figure 25:
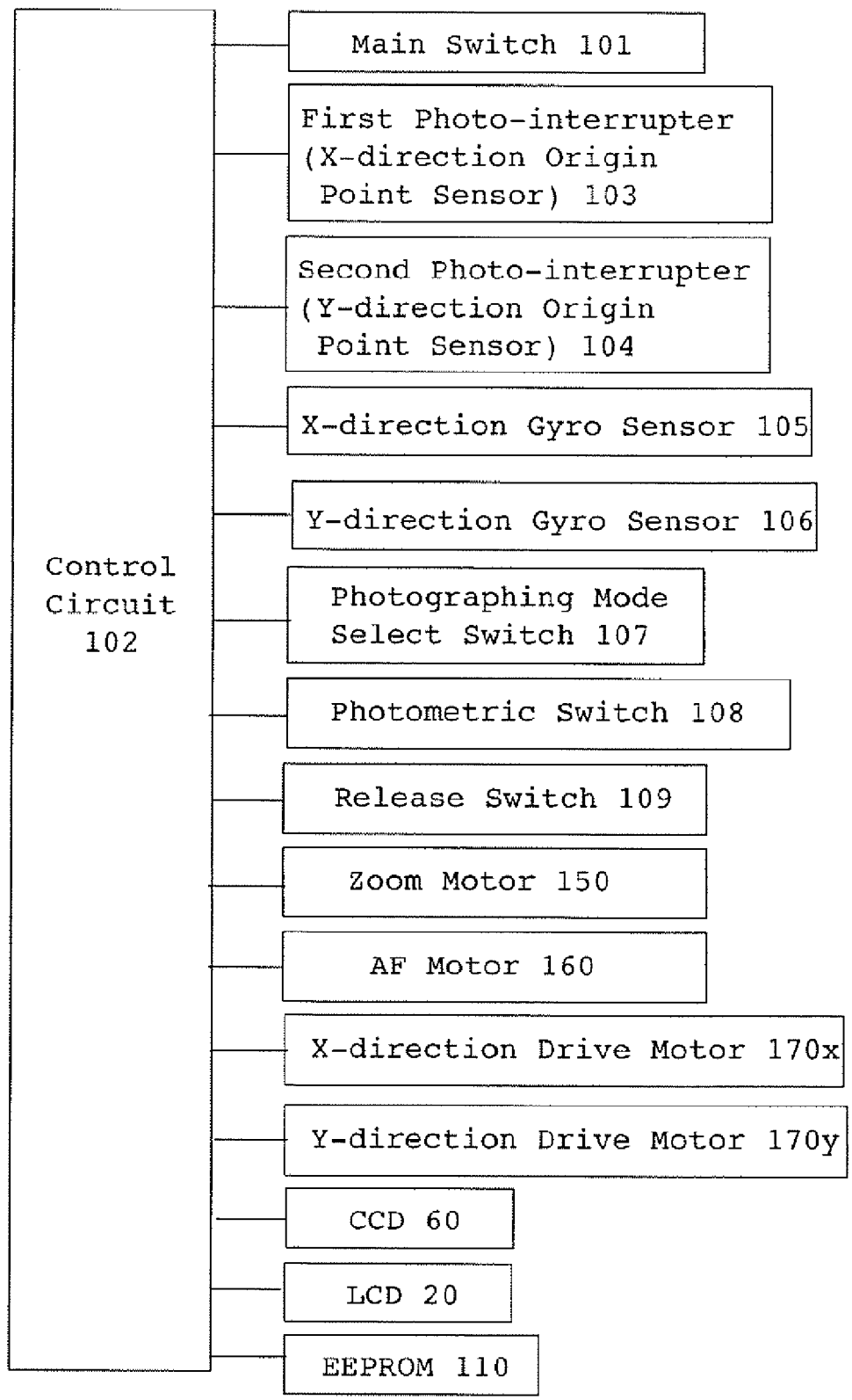
FIG. 25 is a block diagram illustrating a configuration of electrical circuits of the digital camera shown in FIGS. 1 through 3.

The digital camera 200 is provided with an optical image stabilizer. This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a pair of Y-direction guide rods (guide device) 73 and 79 which extend in the Y-direction (the vertical direction of the digital camera 200). The Y-direction moving stage 71 is provided with a guide hole 71a and a guide groove 71b (see FIG. 16) in which the pair of Y-direction guide rods 73 and 79 are engaged so that the Y-direction moving stage 71 is supported by the pair of Y-direction guide rods 73 and 79 to be freely slidable thereon, respectively. A pair of X-direction guide rods (guide device) 72 and 74 are fixed to the Y-direction moving stage 71 to extend in the X-direction (the horizontal direction of the digital camera 200) that is perpendicular to the Y-direction. The X-direction moving stage 21 is provided with a guide hole 21a and a guide groove 21b (see FIGS. 12 and 13) in which the pair of X-direction guide rods 72 and 74 are engaged so that the X-direction moving stage 21 is freely slidable thereon, respectively. Accordingly, the CCD image sensor 60 is supported by the stationary holder 23 via the Y-direction moving stage 71 and the X-direction moving stage 21 to be movable in two axial directions orthogonal to each other in a plane orthogonal to the photographing optical axis Z1. The range of movement of the X-direction moving stage 21 is defined by inner peripheral surfaces of the Y-direction moving stage 71, while the range of movement of the Y-direction moving stage 71 is defined by inner peripheral surfaces of the stationary holder 23.

The image stabilizing unit IS is provided with an X-direction stage biasing spring 87x which is extended so as to be installed between a spring hook 21v formed on the X-direction moving stage 21 and a spring hook 23vx formed on the stationary holder 23. The X-direction stage biasing spring 87x is an extension coil spring and biases the X-direct-on moving stage 21 rightward as viewed from the front of the zoom lens 201 (leftward as viewed from the rear of the zoom lens 201). The image stabilizing unit IS is provided with a Y-direction stage biasing spring 87y which is extended so as to be installed between a spring hook 71v formed on the Y-direction moving stage 71 and a spring hook 23vy formed on the stationary holder 23. The Y-direction stage biasing spring 87y is an extension coil spring and biases the Y-direction moving stage 71 downward.

Figure 16:
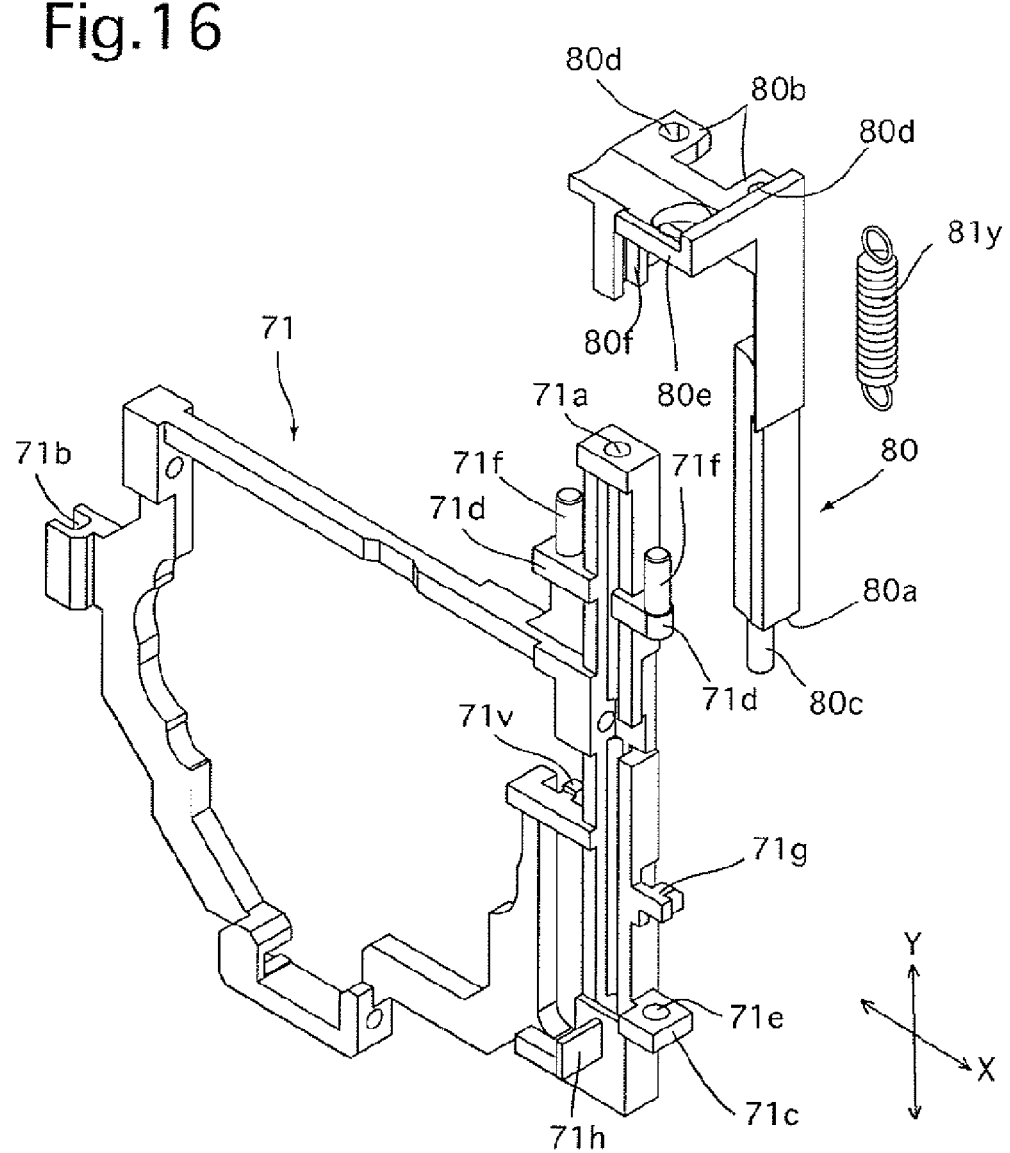
FIG. 16 is an exploded perspective view of a Y-direction moving member, a Y-direction moving stage and an associated extension joining spring of the image stabilizing unit.
Figure 17:
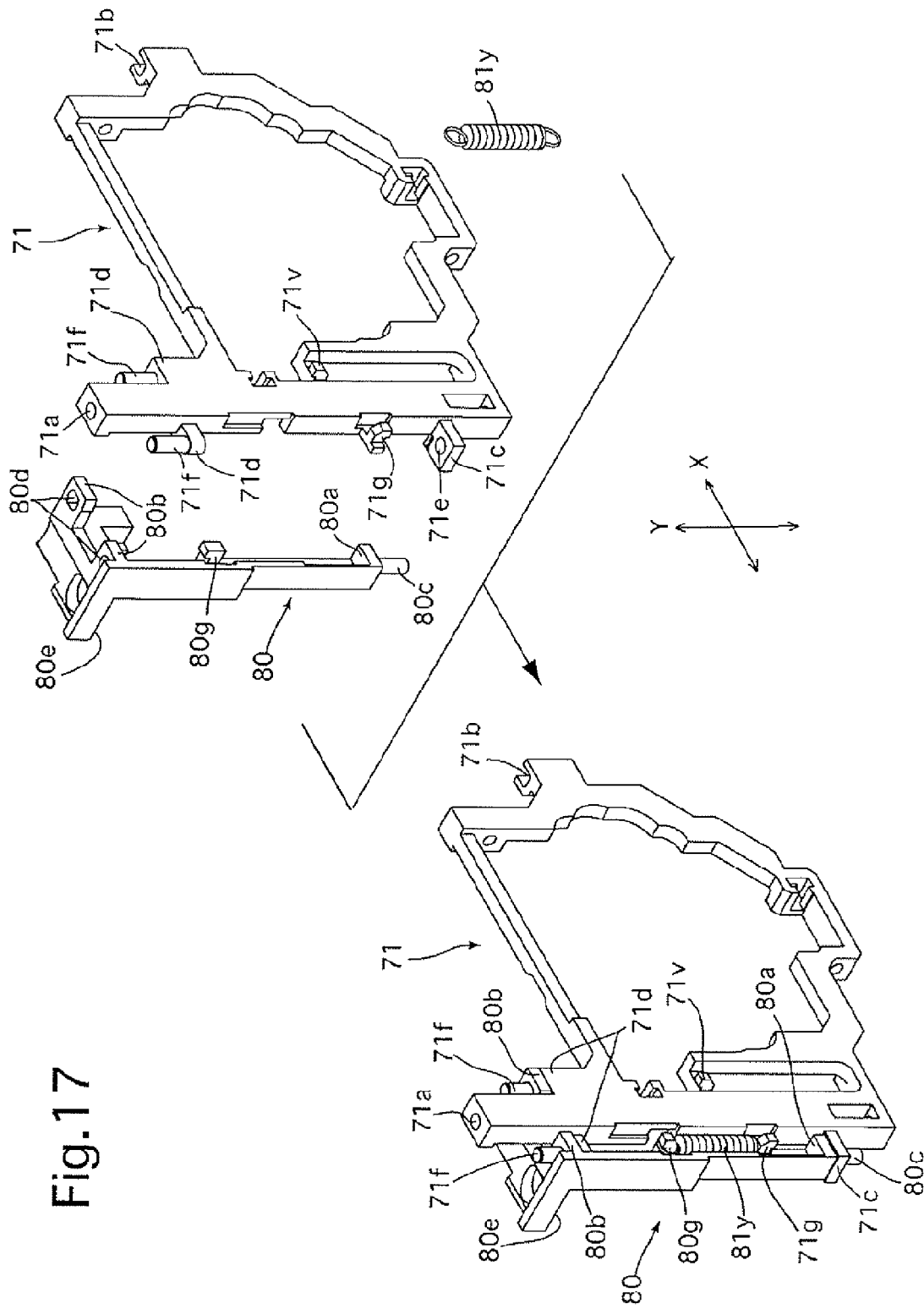
FIG. 17 is a rear perspective view of the Y-direction moving member, the Y-direction moving stage and the associated extension joining spring that are shown in FIG. 16, showing an exploded state and an assembled state thereof.

As shown in FIGS. 16 and 17, the image stabilizing unit IS is provided on one side of the Y-direction moving stage 71 with a Y-direction moving member 80 which is supported by the Y-direction moving stage 71. The Y-direction moving member 80 is elongated in the Y-direction and provided in the vicinity of upper and lower ends of the Y-direction moving member 80 with movement limit lugs 80b and a movement limit lug 80a, respectively. The Y-direction moving member 80 is provided at a lower end thereof with a guide pin 80c which extends downward from the movement limit lug 80a. The movement limit lugs 80b are provided with a pair of guide holes 80d. The Y-direction moving member 80 is further provided in the vicinity of the pair of guide holes 80d with a nut contacting portion 80e and a linear groove 80f (see FIG. 16), and is further provided, on a vertically straight portion of the Y-direction moving member 80 between the movement limit lug 80a and the movement limit lug 80b, with a spring hook 80g (see FIG. 17). The linear groove 80f is elongated in the Y-direction.

The Y-direction moving stage 71 is provided with a movement limit lug 71c and a movement limit lug 71d which face the movement limit lug 80a and the movement limit lug 80b of the Y-direction moving member 80, respectively. The movement limit lug 71c is provided with a guide hole 71e in which the guide pin 80c is slidably engaged, and the movement limit lug 71d is provided with a pair of guide pins 71f which extend upward to be slidably engaged in the pair of guide holes 80d, respectively. The Y-direction moving stage 71 is provided on a vertically straight portion thereof between the movement limit lug 71c and a movement limit lug 71d, with a spring hook 71g.

The Y-direction moving stage 71 and the Y-direction moving member 80 are guided to be movable relative to each other in the Y-direction by the engagement of the guide hole 71e with the guide pin 80c and the engagement of the pair of guide pins 71f with the pair of guide holes 80d. The image stabilizing unit IS is provided with an extension joining spring 81y which is extended so as to be installed between the spring hook 71g of the Y-direction moving stage 71 and the spring hook 80g of the Y-direction moving member 80. The extension joining spring 81y biases the Y-direction moving stage 71 and the Y-direction moving member 80 in opposite directions to bring the movement limit lug 80a and the movement limit lug 71c into contact with each other and to bring the movement limit lugs 80b and the movement limit lugs 71d into contact with each other, i.e., in opposite directions to move the Y-direction moving stage 71 and the Y-direction moving member 80 upward and downward, respectively.

Figure 14:
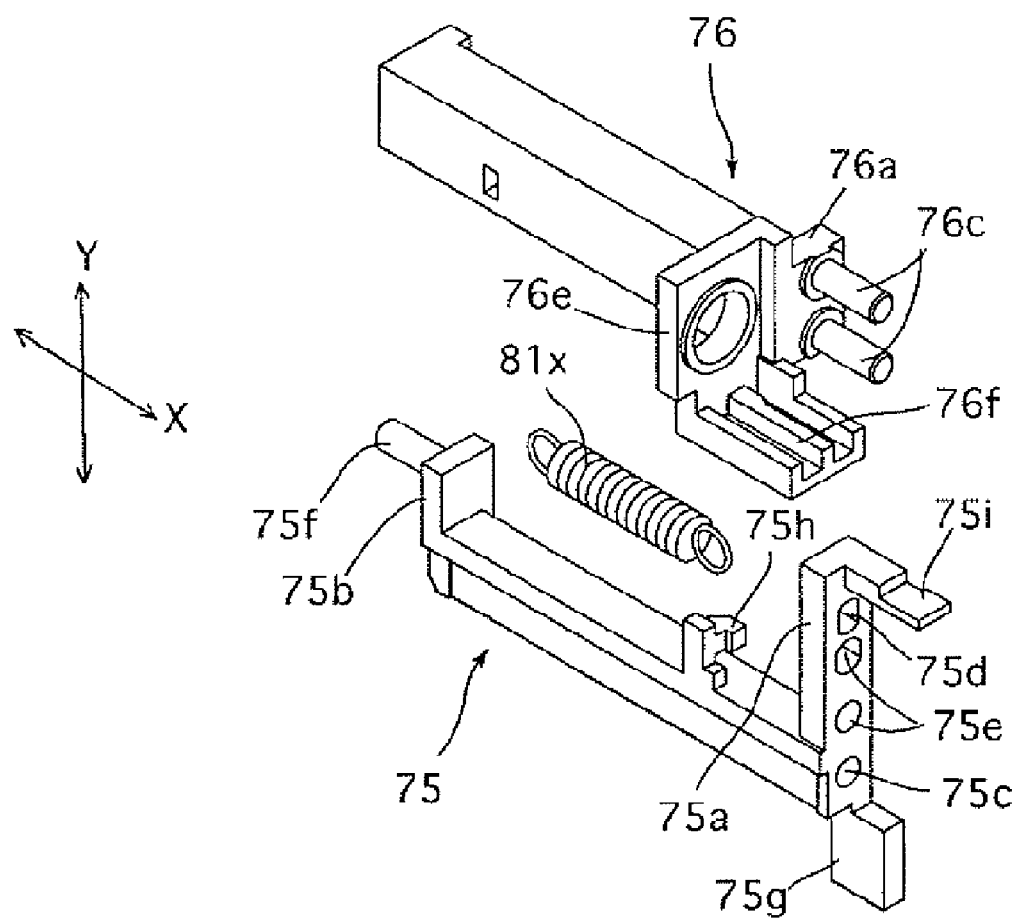
FIG. 14 is a front perspective view of a first X-direction moving member, a second X-direction moving member and an associated extension joining spring of the image stabilizing unit, showing an exploded state thereof.
Figure 15:
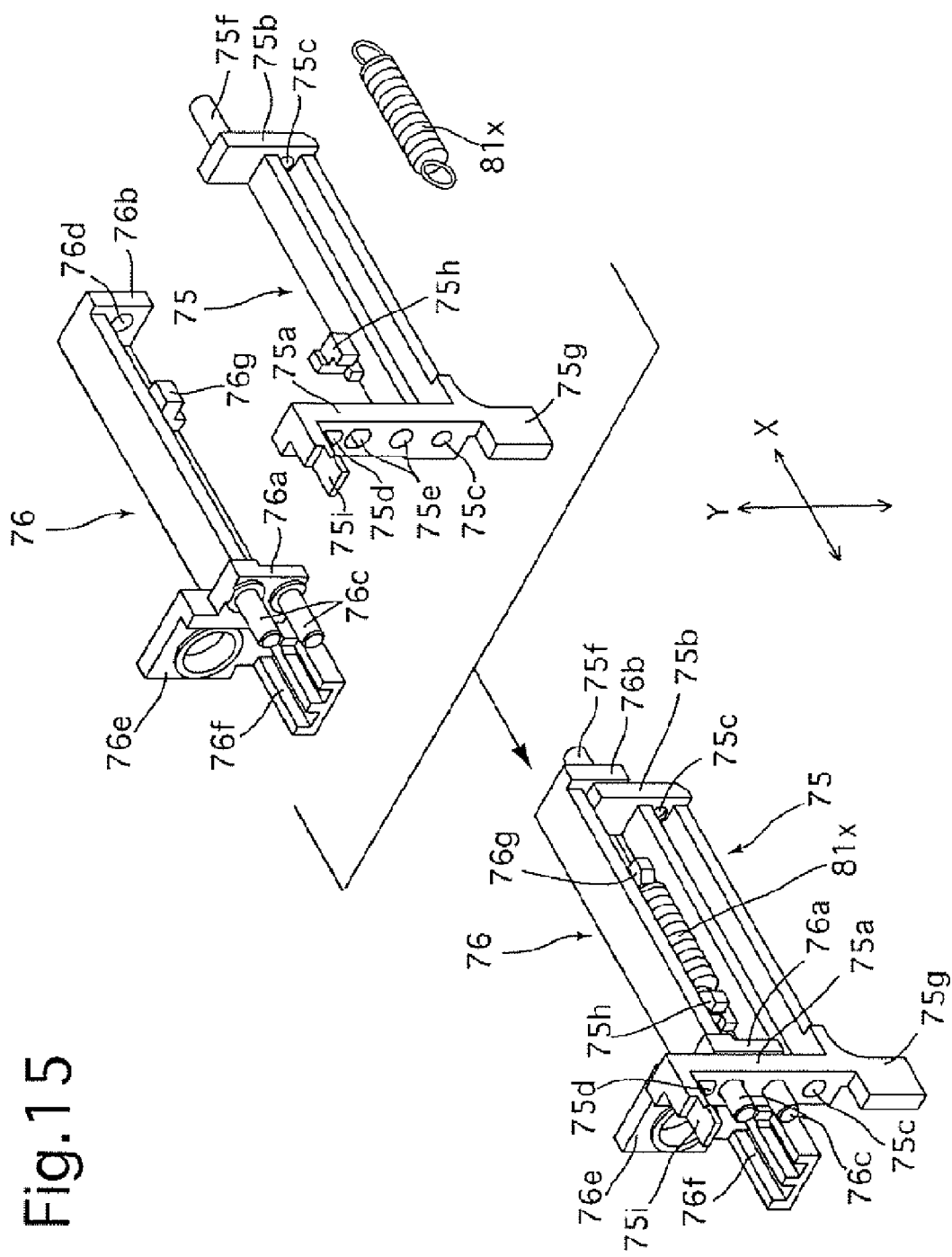
FIG. 15 is a rear perspective view of the first X-direction moving member, the second X-direction moving member and the associated extension joining spring that are shown in FIG. 14, showing an exploded state and an assembled state thereof.

Another pair of X-direction guide rods 77 and 78 that are different from the pair of X-direction guide rods 72 and 74 are fixed to the stationary holder 23 to extend in the X-direction. The image stabilizing unit IS is provided with a first X-direction moving member 75 which is supported by the stationary holder 23 via the pair of X-direction guide rods 77 and 78 to be freely slidable thereon. As shown in FIGS. 14 and 15, the first X-direction moving member 75 is elongated in the X-direction, and is provided, in the vicinity of opposite ends of the first X-direction moving member 75 in the X-direction, with a movement limit lug 75a and a movement limit lug 75b, respectively. A pair of guide holes 75c in which the X-direction guide rod 77 is inserted are formed on the movement limit lugs 75a and 75b, respectively, and are aligned in the X-direction. A guide hole 75d in which the X-direction guide rod 78 is inserted is formed on the movement limit lug 75a. No guide hole corresponding to the guide hole 75d is formed on the movement limit lug 75b. The movement limit lug 75a is provided between the associated guide hole 75c and the guide hole 75d with a pair of guide holes 75e. The movement limit lug 75b is provided, above the associated guide hole 75c in the Y-direction (see FIG. 15) with a guide pin 75f which extends in the X-direction in a direction away from the movement limit lug 75a. The first X-direction moving member 75 is further provided at the bottom of the movement limit lug 75a with a linkage projection 75g, and is further provided, on a horizontally straight portion of the first X-direction moving member 75 between the movement limit lug 75a and a movement limit lug 75b, with a spring hook 75h.

The image stabilizing unit IS is provided on the first X-direction moving member 75 with a second X-direction moving member 76. The second X-direction moving member 76 is provided with a movement limit lug 76a and a movement limit lug 76b which are separate from each other in the X-direction. The movement limit lug 76a is provided with a pair of guide pins 76c which extend in the X-direction to be slidably engaged with the pair of guide holes 75e of the first X-direction moving member 75, respectively, and the movement limit lug 76b is provided with a guide hole 76d in which the guide pin 75f of the first X-direction moving member 75 is slidably engaged. The second X-direction moving member 76 is further provided in the vicinity of the movement limit lug 76a with a nut contacting portion 76e and a linear groove 76f (see FIG. 15), and is further provided, on a horizontally straight portion of the second X-direction moving member 76 between the movement limit lug 76a and the movement limit Tug 76b, with a spring hook 76g. The linear groove 76f is elongated in the X-direction.

The first X-direction moving member 75 and the second X-direction moving member 76 are guided to be movable relative to each other in the X-direction by the engagement of the pair of guide pins 76c with the pair of guide holes 75e and the engagement of the guide pin 75f with the guide hole 76d. The image stabilizing unit IS is provided with an extension joining spring 81x which is extended so as to be installed between the spring hook 75h of the first X-direction moving member 75 and the spring hook 76g of the second X-direction moving member 76. The extension joining spring 81x biases the first X-direction moving member 75 and the second X-direction moving member 76 in opposite directions to bring the movement limit lug 75a and the movement limit lug 76a into contact with each other and to bring the movement limit lug 75b and the movement limit lug 76b into contact with each other The linkage projection 75g of the first X-direction moving member 75 is in contact with a transfer roller 21c (see FIGS. 12, 13 and 24) mounted to the X-direction moving stage 21 so that a moving force in the X-direction is transferred from the first X-direction moving member 75 to the X-direction moving stage 21 via the contacting engagement between the linkage projection 75g and the transfer roller 21c. The transfer roller 21c is supported by a rotation pin parallel to the photographing optical axis Z1 so as to be freely rotatable on the rotation pin. When the X-direction moving stage 21 moves with the Y-direction moving stage 71 in the Y-direction, the transfer roller 21c rolls on a contacting surface of the linkage projection 75g. This contacting surface of the linkage projection 75g is a flat surface elongated in the Y-direction, and accordingly, the structure allowing the transfer roller 21c to roll on the contacting surface of the linkage projection 75g makes it possible for the X-direction moving stage 21 to move in the Y-direction without exerting any driving force in the Y-direction to the first X-direction moving member 75.

Figure 11:
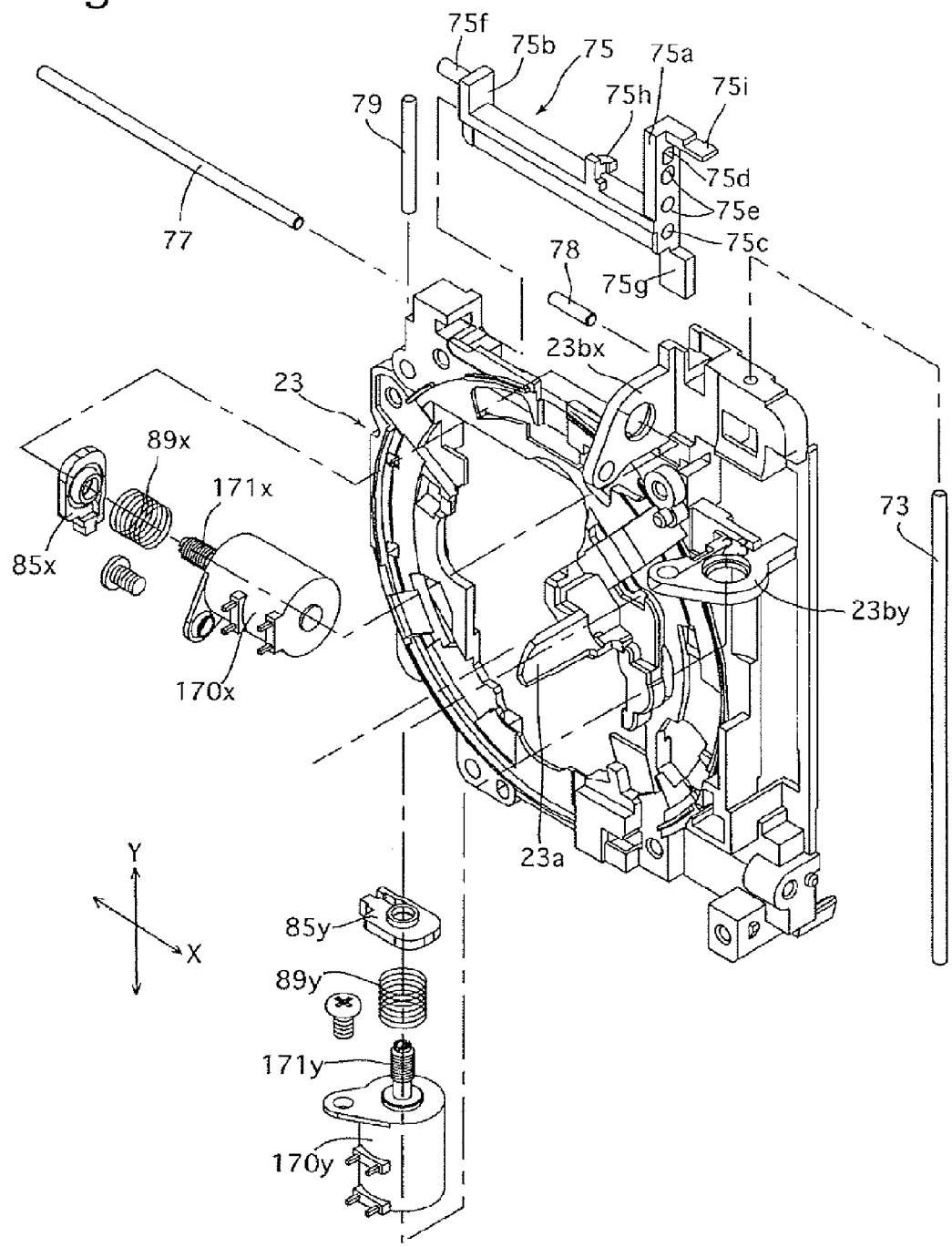
FIG. 11 is an exploded perspective view of a portion of the image stabilizing unit in the vicinity of a stationary holder thereof.
Figure 12:
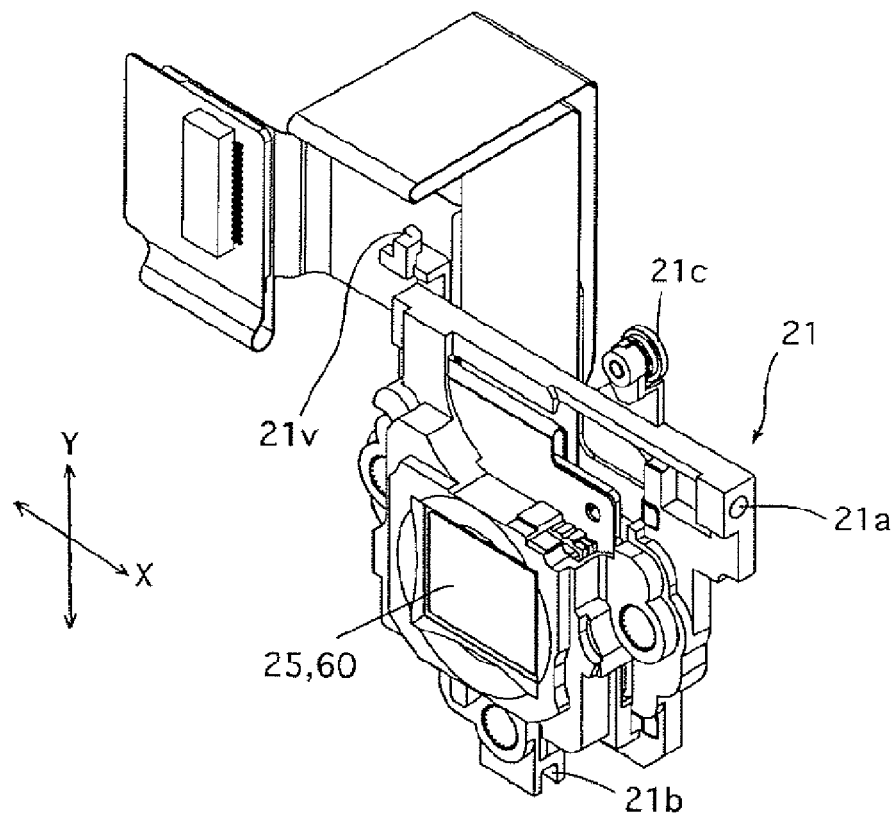
FIG. 12 is a front perspective view of a CCD unit shown in FIG. 10 that includes an X-direction moving stage.
Figure 13:
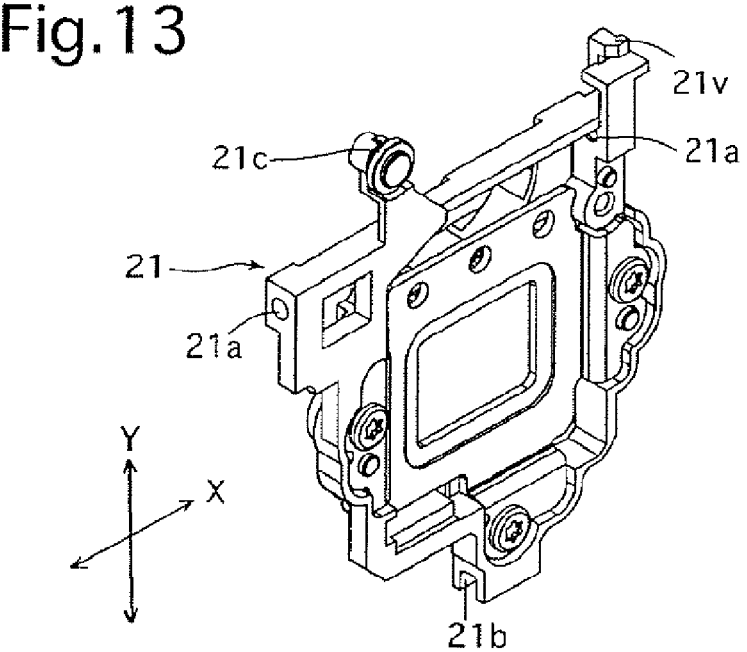
FIG. 13 is a rear perspective view of the X-direction moving stage.

As shown in FIG. 11, the image stabilizing unit IS is provided with an X-direction drive motor (drive source) 170x serving as a drive source for driving the CCD image sensor 60 in the X-direction and a Y-direction drive motor (drive source) 170y serving as a drive source for driving the CCD image sensor 60 in the Y-direction. The X-direction drive motor 170x and the Y-direction drive motor 171y are fixed to a motor bracket 23bx and a motor bracket 23by, respectively, which are integrally formed on the stationary holder 23. Each of the X-direction drive motor 170x and the Y-direction drive motor 170y is a stepping motor. A drive shaft (rotary shaft) of the X-direction drive motor 170x is threaded to serve as a feed screw 171x, and a drive shaft (rotary shaft) of the Y-direction drive motor 170y is threaded to serve as a feed screw 171y. The feed screw 171x is screwed into a female screw hole of an X-direction driven nut member 85x and the feed screw 171y is screwed into a female screw hole of a Y-direction driven nut member 85y. The X-direction driven nut member 85x is guided linearly in the X-direction by the linear groove 76f, and is in contact with the nut contacting portion 76e. The Y-direction driven nut member 85y is guided linearly in the Y-direction by the linear groove 80f, and is in contact with the nut contacting portion 80e. The X-direction driven nut member 85x can be screw-disengaged from either end of the feed screw 171x, and the Y-direction driven nut member 85y can be screw-disengaged from either end of the feed screw 171y. A nut-member biasing spring 89x is positioned between the X-direction driven nut member 85x and the X-direction drive motor 170x, and a nut-member biasing spring 89y is positioned between the Y-direction driven nut member 85x and the X-direction drive motor 170y. Each of the nut-member biasing springs 89x and 89y is a compression coil spring which is loosely fitted on the associated feed screw 171x and 171y, respectively, in a compressed state. The nut-member biasing spring 89x biases the X-direction driven nut member 85x in a direction to bring the X-direction driven nut member 85y back into screw engagement with the X-direction drive motor 170x in the case where the X-direction driven nut member 85y is disengaged from the X-direction drive motor 170x toward the X-direction drive motor 170x side. Likewise, the nut-member biasing spring 89y biases the Y-direction driven nut member 85y in a direction to bring the Y-direction driven nut member 85y back into screw engagement with the Y-direction drive motor 170y in the case where the Y-direction driven nut member 85y is disengaged from the Y-direction drive motor 170y toward the Y-direction drive motor 170y side.

Figure 24:
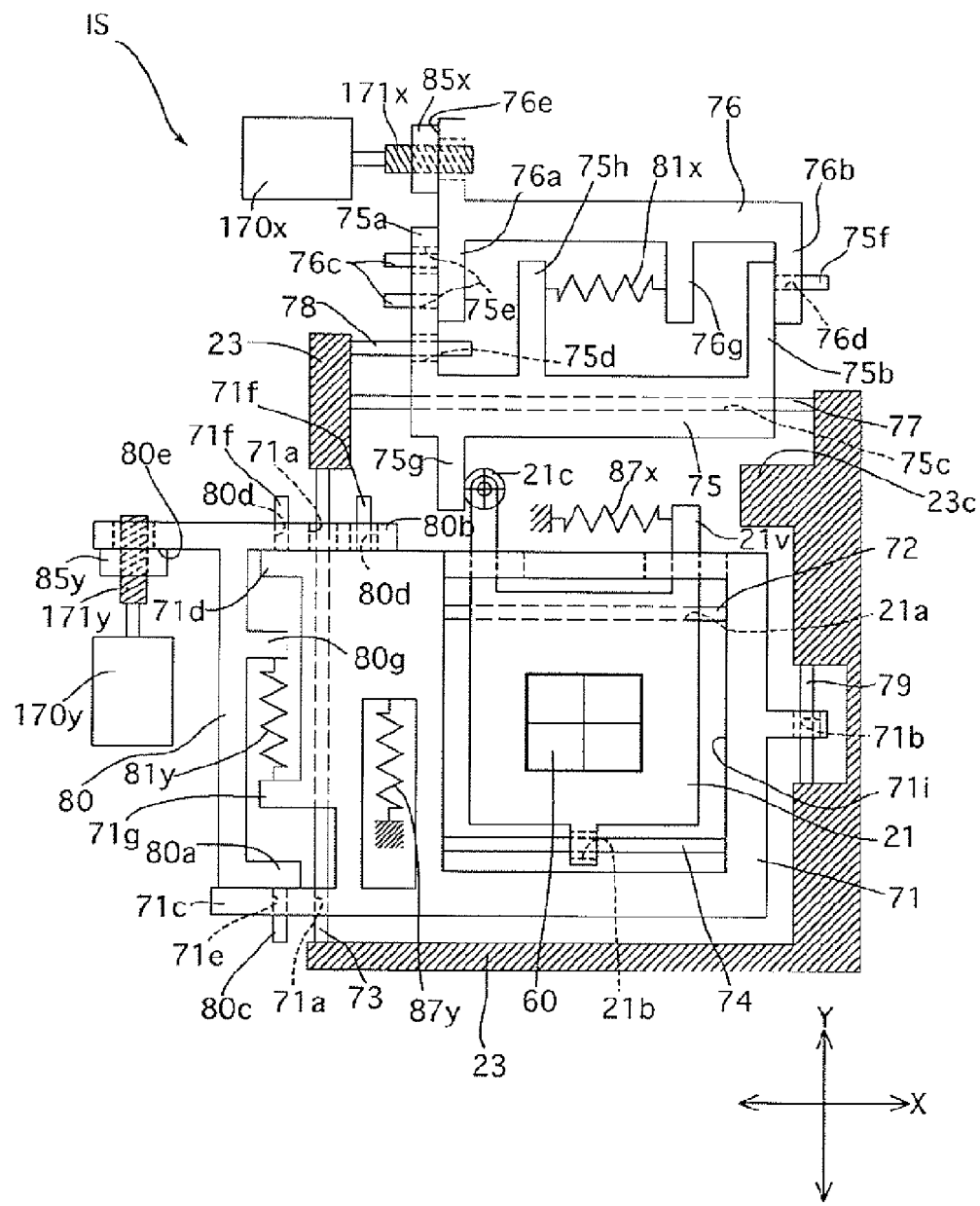
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the X-direction guide rod 78 and the pair of guide pins 76c, etc., are different from those shown in FIGS. 7 through 23 for the purpose of illustration As can be understood from FIG. 24, in the driving mechanism for driving the CCD image sensor 60 in the X-direction, the first X-direction moving member 75 and the second X-direction moving member 76 are coupled to each other resiliently by the biasing force of the extension joining spring 81x with the movement limit Lug 75a and the movement limit lug 75b in contact with the movement limit lug 76a and the movement limit lug 76b, respectively. The biasing force of the X-direction stage biasing spring 87x is exerted on the first X-direction moving member 75 via the transfer roller 21c, which is in contact with the linkage projection 75g. Although the biasing force of the X-direction stage biasing spring 87x is exerted on the first X-direction moving member 75 leftward as viewed in FIG. 24, i.e., in a direction to disengage the movement limit lugs 75a and 75b from the movement limit lugs 76a and 76b, respectively, the biasing force (spring force) of the extension joining spring 81x is predetermined to be greater than that of the X-direction stage biasing spring 87x. Therefore, the first X-direction moving member 75 and the second X-direction moving member 76 are collectively biased leftward as viewed in FIG. 24 while maintaining the movement limit lugs 75a and 75b in resilient contact with the movement limit lugs 76a and 76b, respectively. Since the leftward movement of the second X-direction moving member 76 is limited by the engagement of the nut contacting portion 76e with the X-direction driven nut member 85x, the position of the X-direction driven nut member 85x serves as a reference position for each of the first X-direction moving member 75 and the second X-direction moving member 76 in the X-direction. As can be seen in FIG. 24, the end of the feed screw 171x extends through a through-hole (see FIGS. 14 and 15) formed on the nut contacting portion 76e so as not to interfere therewith.

Driving the X-direction drive motor 170x to rotate the drive shaft thereof (the feed screw 171x) causes the X-direction driven nut member 85x, that is screw-engaged with the feed screw 171x, to move linearly in the X-direction, thus causing the relative position between the first X-direction moving member 75 and the second X-direction moving member 76 in the X-direction to vary. For instance, if the X-direction driven nut member 85x is moved rightward with respect to the view shown in FIG. 24, the X-direction driven nut member 85x presses the nut contacting portion 76e in the rightward direction to thereby integrally move the first X-direction moving member 75 and the second X-direction moving member 76 rightward as viewed in FIG. 24 against the spring force of the X-direction stage biasing spring 87x. If the first X-direction moving member 75 is moved rightward with respect to the view shown in FIG. 24, the linkage projection 75g presses the transfer roller 21c in the rightward direction to thereby move the X-direction moving stage 21 rightward with respect to the view shown in FIG. 24. Conversely, if the X-direction driven nut member 85x is moved leftward with respect to the view shown in FIG. 24, the first X-direction moving member 75 and the second X-direction moving member 76 follow the X-direction driven nut member 85x to integrally move leftward with respect to the view shown in FIG. 24 by the biasing force of the X-direction stage biasing spring 87x. At this time, the X-direction moving stage 21 follows the first X-direction moving member 75 to move leftward as viewed in FIG. 24 due to the biasing force of the X-direction stage biasing spring 87x. The linkage projection 75g and the transfer roller 21c are maintained in contact with each other at all times by the biasing force of the X-direction stage biasing spring 87x.

In the driving mechanism for driving the CCD image sensor 60 in the Y-direction, the Y-direction moving stage 71 and the Y-direction moving member 80 are resiliently coupled to each other via the extension joining spring 81y with the movement limit lugs 71c and 71d being in contact with the movement limit lugs 80a and 80b, respectively. Although the Y-direction moving stage 71 is biased downward as viewed in FIG. 24 by the spring force of the Y-direction stage biasing spring 87y, i.e., in a direction to disengage the movement limit lugs 71c and 71d from the movement limit lugs 80a and 80b, respectively, the biasing force (spring force) of the extension joining spring 81y is predetermined to be greater than that of the Y-direction stage biasing spring 87y. Therefore, the Y-direction moving stage 71 and the Y-direction moving member 80 are collectively biased downward while maintaining the movement limit lugs 71c and 71d in resilient contact with the movement limit lugs 80a and 80b, respectively. Since the downward movement of the Y-direction moving member 80 is limited by the engagement of the nut contacting portion 80e with the Y-direction driven nut member 85y the position of the Y-direction driven nut member 85y serves as a reference position for each of the Y-direction moving stage 71 and the Y-direction moving member 80 in the Y-direction. As can be seen in FIG. 24, the end of the feed screw 171y extends through a through-hole (see FIGS. 16 and 17) formed on the nut contacting portion 80e so as not to interfere therewith.

Driving the Y-direction drive motor 170y to rotate the drive shaft thereof (the feed screw 171y) causes the Y-direction driven nut member 85y, that is screw-engaged with the feed screw 171y, to move linearly in the Y-direction, thus causing the relative position between the Y-direction moving stage 71 and the Y-direction moving member 80 in the Y-direction to vary. For instance, if the Y-direction driven nut member 85y is moved upward with respect to the view shown in FIG. 24, the Y-direction driven nut member 85y presses the nut contacting portion 80e in the upward direction to thereby integrally move the Y-direction moving stage 71 and the Y-direction moving member 80 upward with respect to the view shown in FIG. 24 against the spring force of the Y-direction stage biasing spring 87y. Conversely, if the Y-direction driven nut member 85y is moved downward with respect to the view shown in FIG. 24, the Y-direction moving stage 71 and the Y-direction moving member 80 follow the Y-direction driven nut member 85y to integrally move downward by the biasing force of the Y-direction stage biasing spring 87y.

When the Y-direction moving stage 71 moves in the Y-direction, the X-direction moving stage 21 that is supported by the Y-direction moving stage 71 thereon moves together with the Y-direction moving stage 71. On the other hand, when the X-direction moving stage 21 moves together with the Y-direction moving stage 71 vertically in the Y-direction, the contacting point between the transfer roller 21c and the contacting surface of the linkage projection 75g varies because the first X-direction moving member 75, with which the transfer roller 21c is in contact, does not move in the Y-direction. During this movement, the transfer roller 21c rolls on the contacting surface of the linkage projection 75g so that the X-direction moving stage 21 can be moved in the Y-direction without exerting any driving force on the first X-direction moving member 75 in the Y-direction.

According to the above described structure of the image stabilizing unit IS, the X-direction moving stage 21 can be moved forward and reverse in the X-direction by driving the X-direction drive motor 170x forward and reverse, respectively, and the Y-direction moving stage 71, together with the X-direction moving stage 21 that is supported by the Y-direction moving stage 71, can be moved forward and reverse in the Y-direction by driving the Y-direction drive motor 170y forward and reverse, respectively.

Figure 18:
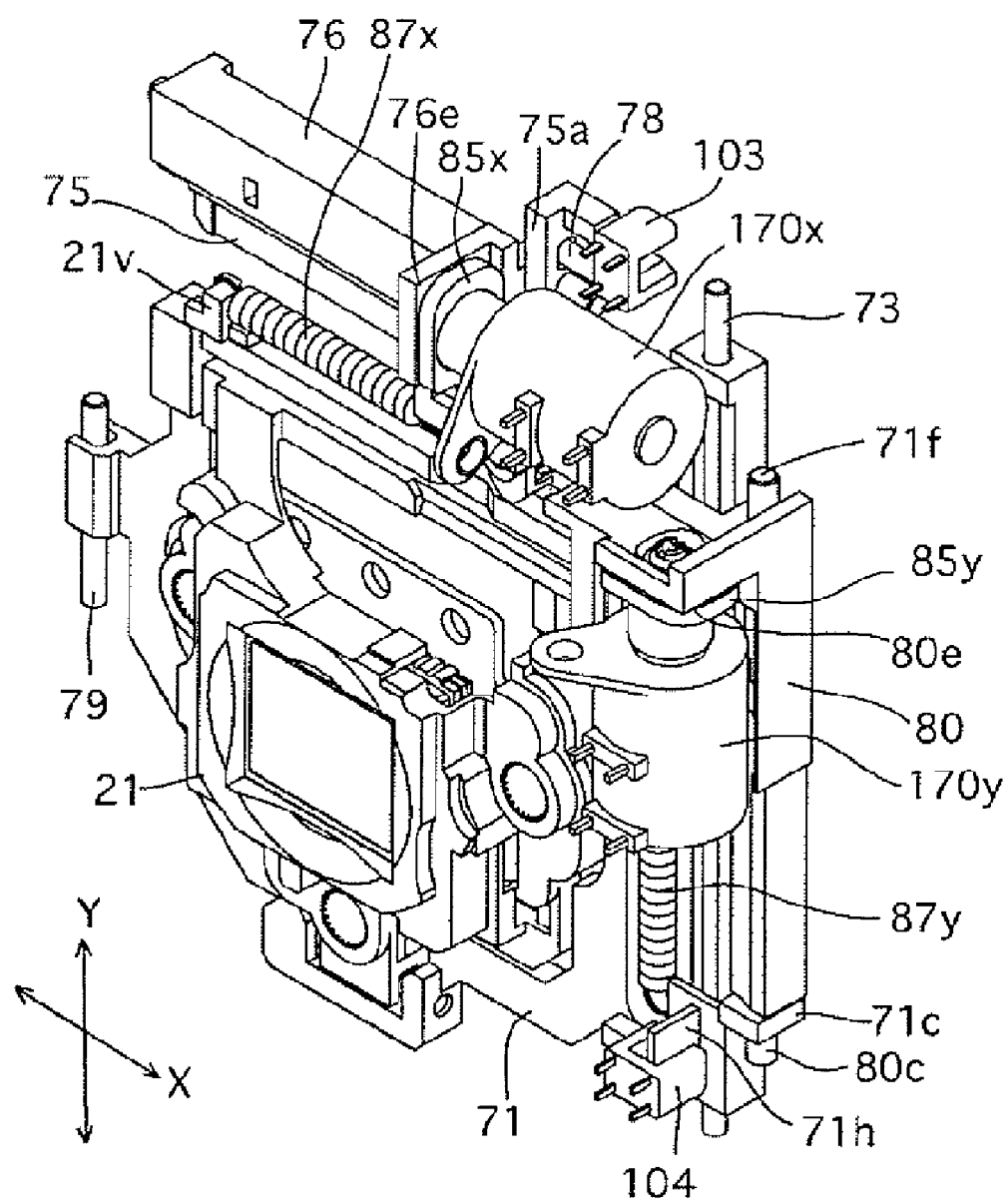
FIG. 18 is a front perspective view of the image stabilizing unit from which the stationary holder is removed.
Figure 19:
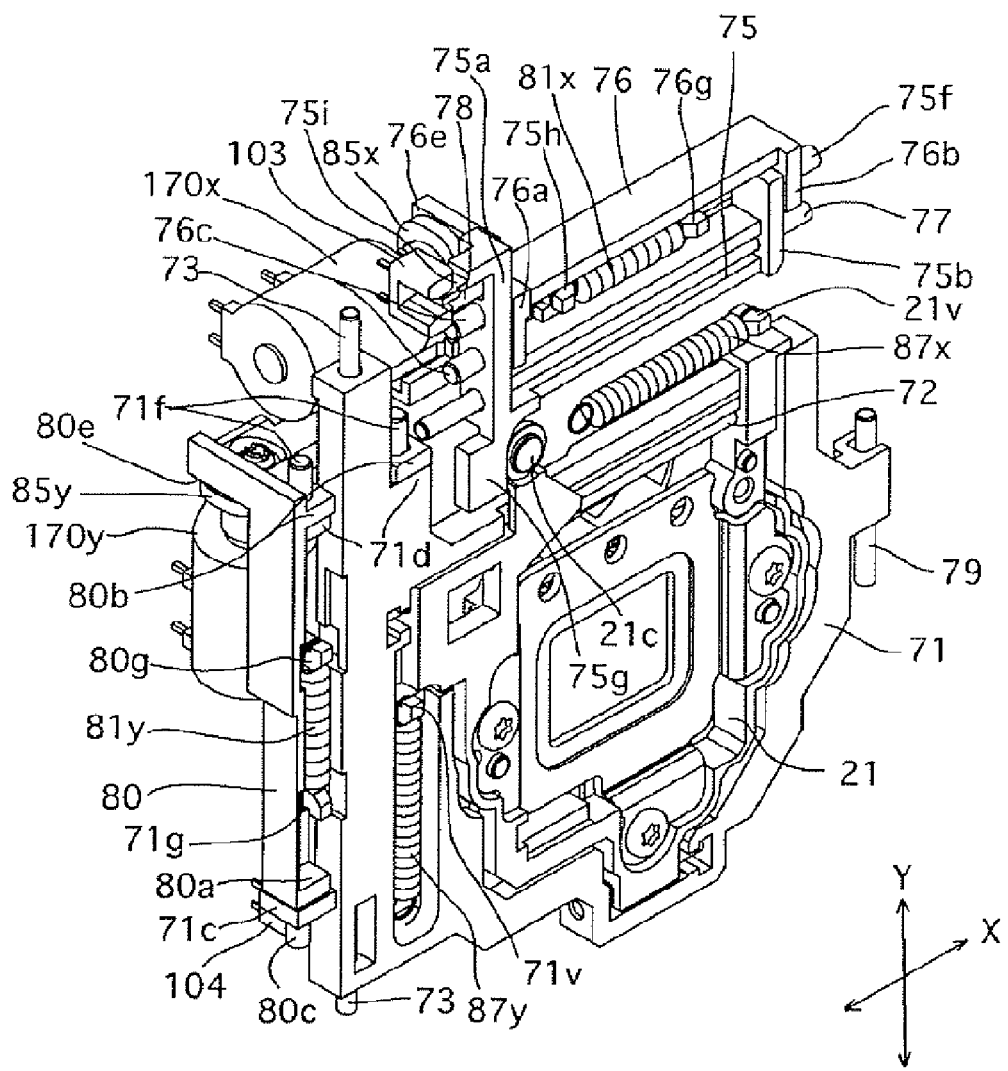
FIG. 19 is a rear perspective view of the elements of the image stabilizing unit shown in FIG. 18.
Figure 20:
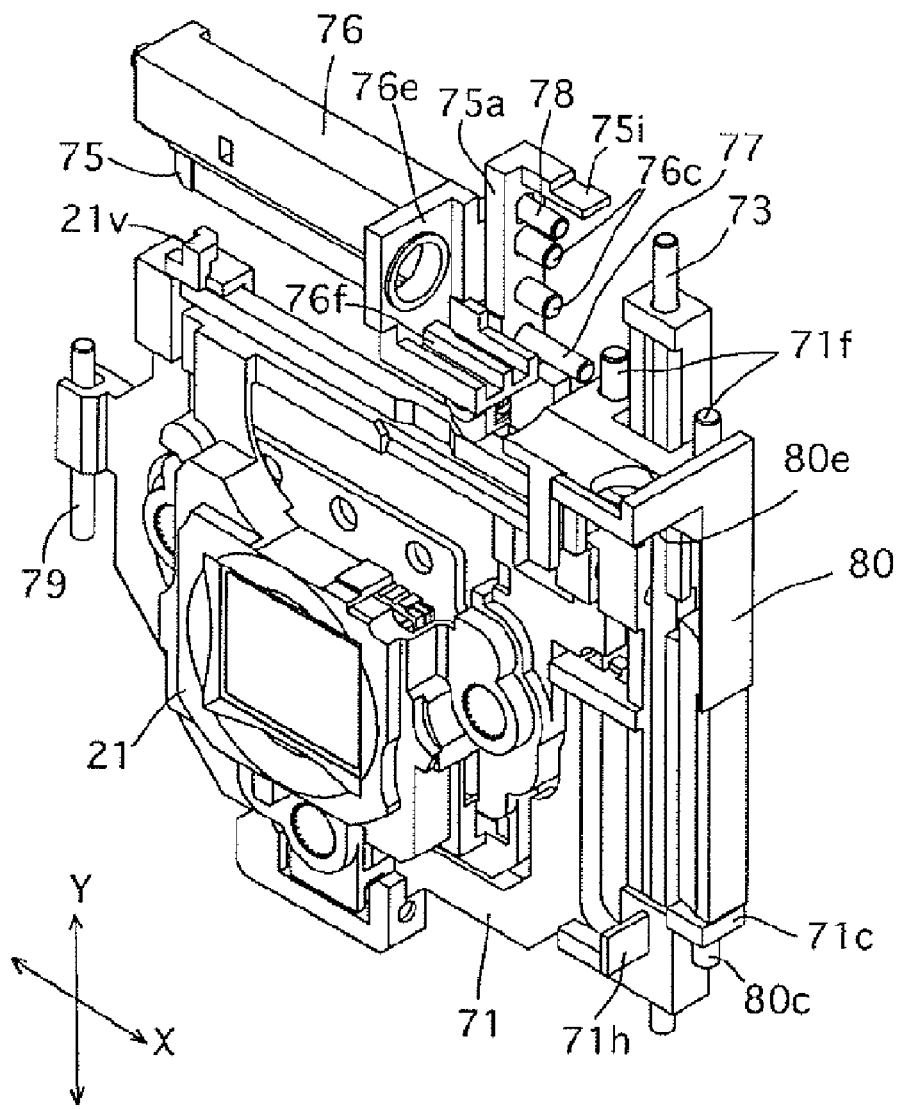
FIG. 20 is a front perspective view of the elements of the image stabilizing unit shown in FIGS. 18 and 19 from which drive motors, photo-interrupters and biasing springs are further removed.
Figure 21:
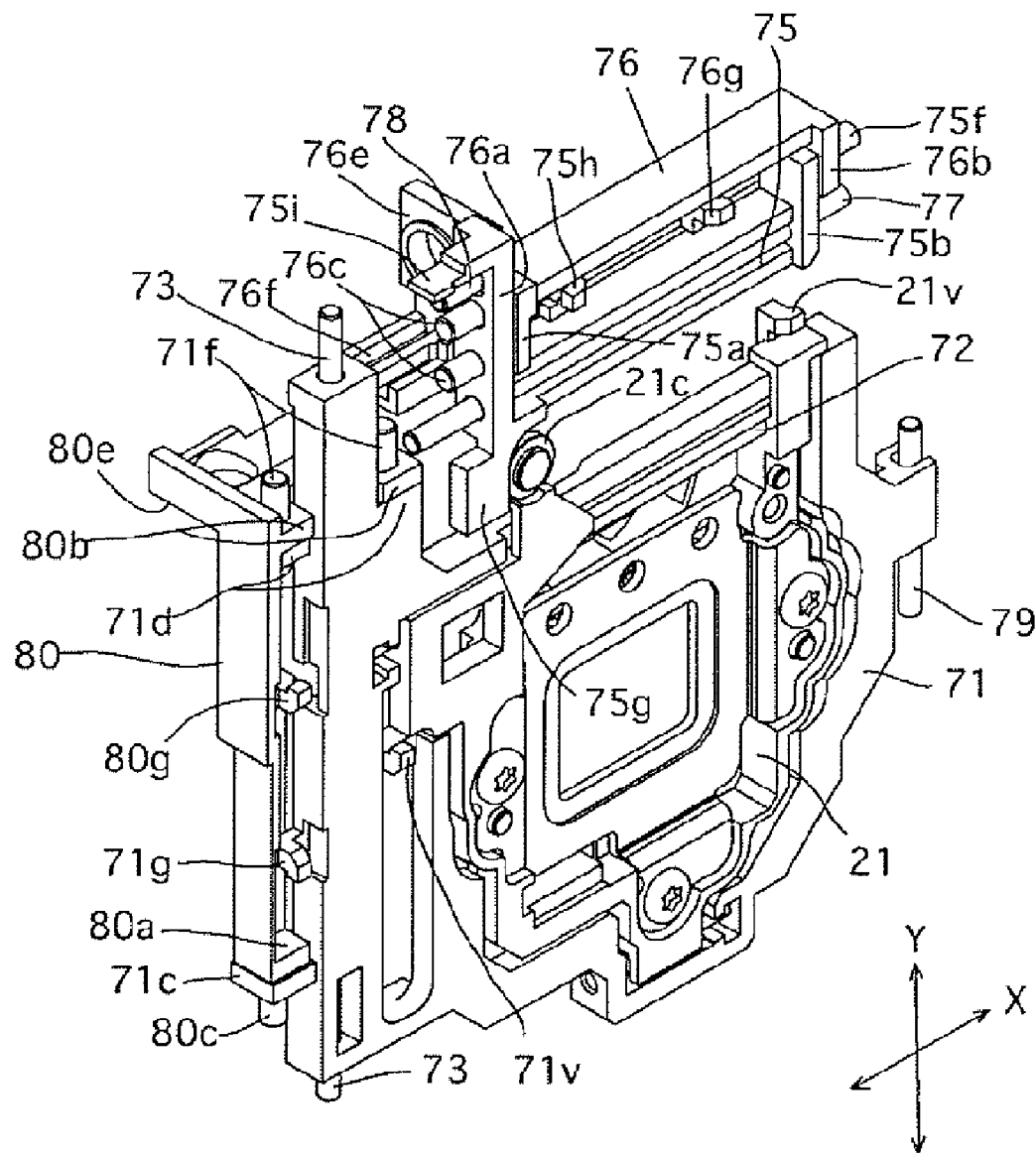
FIG. 21 is a rear perspective view of the elements of the image stabilizing unit shown in FIG. 20.
Figure 22:
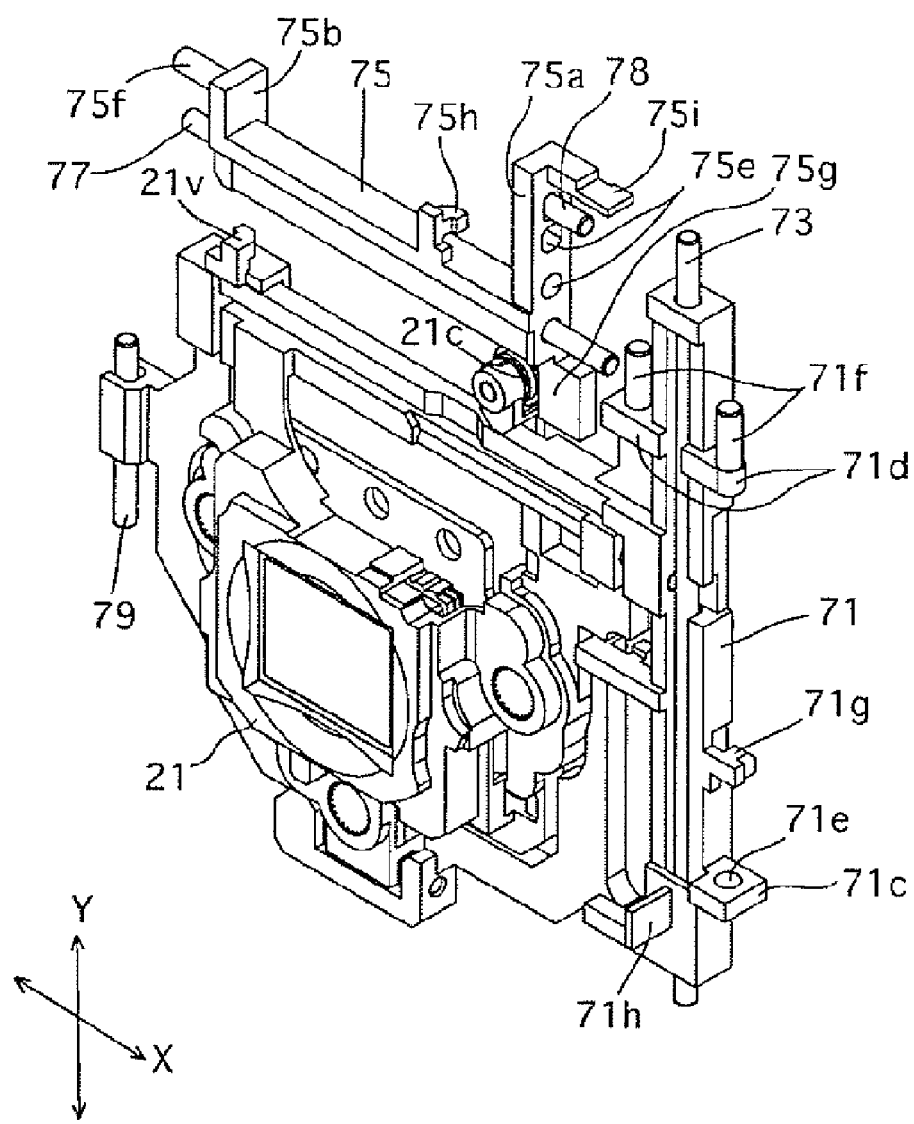
FIG. 22 is a front perspective view of the elements of the image stabilizing unit shown in FIGS. 20 and 21 from which the second X-direction moving member and the Y-direction moving member are further removed.
Figure 23:
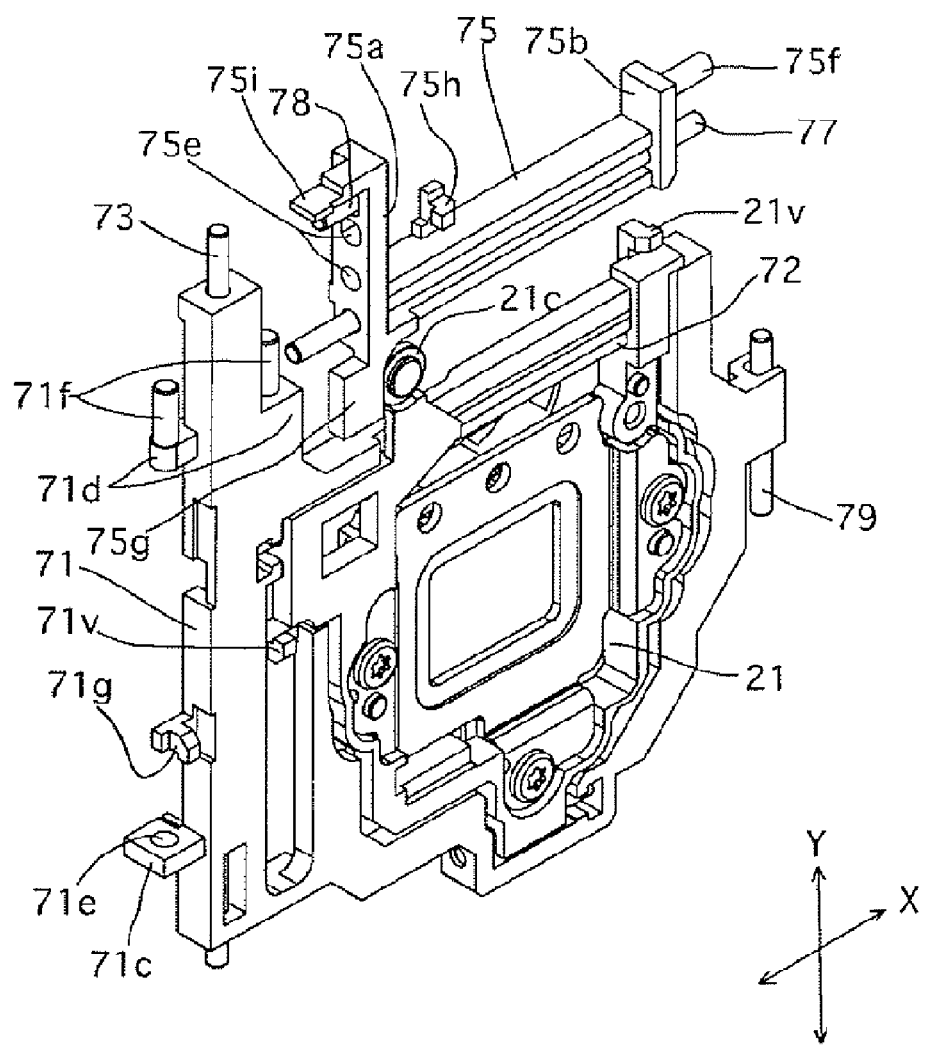
FIG. 23 is a rear perspective view of the elements of the image stabilizing unit shown in FIG. 22.

As shown in FIGS. 14 and 15, the first X-direction moving member 75 is provided in the vicinity of the movement limit lug 75a with a position detection lug 75i in the shape of a small thin plate. As shown in FIG. 16, the Y-direction moving stage 71 is provided in the vicinity of the movement limit lug 71c with a position detection lug 71h in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75i of the first X-direction moving member 75 that passes between mutually facing emitter/receiver elements when the light beam is blocked by the position detection lug 75i. Likewise, the second photo-interrupter 104 detects the presence of the position detection lug 71h of the Y-direction moving stage 71 that passes between mutually facing emitter/receiver elements when the light beam is blocked by the position detection lug 71h. The initial position of the first X-direction moving member 75 (the X-direction moving stage 21) in the X-direction can be detected by detecting the presence of the position detection lug 75i by the first photo-interrupter 103, and the initial position of the Y-direction moving stage 71 in the Y-direction can be detected by detecting the presence of the position detection lug 71h by the second photo-interrupter 104.

As shown in the block diagram in FIG. 25, the digital camera 200 is provided with an X-direction gyro sensor (angular velocity sensor) 105 and a Y-direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-direction and in the Y-direction. The control circuit 102 further calculates the driving amounts and the driving directions of the X-direction moving stage 21 (the first X-direction moving member 75 and the second X-direction moving member 76) and the Y-direction moving stage 71 (the Y-direction moving member 80) for the respective axial directions (driving pulses for the X-direction drive motor 170x and the Y-direction drive motor 170y) in order to counteract camera shake.

Thereupon, the X-direction drive motor 170x and the Y-direction drive motor 170y are actuated and the operations thereof are controlled in accordance with the calculated values. Namely, the control circuit 102 supplies a driving signal for correction of image shake to each of the X-direction drive motor 170x and the Y-direction drive motor 170y to thereby correct (counteract) image shake of an object image which is captured by the CCD image sensor 60. The digital camera 200 can be put into this image stabilization mode by turning on a photographing mode select switch 107 (see FIG. 25). If the photographing mode select switch 107 is in an off-state, the image stabilizing capability is deactivated so that a normal photographing operation is performed. Additionally, by operating the photographing mode select switch 107, either a first tracking mode or a second tracking mode can be selected in the image stabilization mode. The image stabilizing capability remains activated by driving the X-direction drive motor 170x and the Y-direction drive motor 170y in the first tracking mode, while the image stabilizing capability is activated by driving the X-direction drive motor 170x and the Y-direction drive motor 170y only when a photometric switch 108 or a release switch 109 (see FIG. 25) provided in the digital camera 200 is turned ON in the second tracking mode. The photometric switch 108 is turned ON by depressing the shutter button 205 halfway, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-direction drive motor 170x and the Y-direction drive motor 170y to the CCD image sensor 60 (the X-direction moving stage 21) to prevent damage to the feed screws 171x and 171y and other associated elements. This damage-protection structure is composed of two major components: a first component composed of the first X-direction moving member 75 and the second X-direction moving member 76 (which are resiliently coupled to each other by the extension joining spring 81x) in the driving mechanism for driving the CCD image sensor 60 in the X-direction and a second component composed of the Y-direction moving stage 71 and the Y-direction moving member 80 (which are resiliently coupled to each other by the extension joining spring 81y) in the driving mechanism for driving the CCD image sensor 60 in the Y-direction.

The driving mechanism for driving the CCD image sensor 60 in the X-direction has the capability of protecting itself from damage. This capability will be discussed hereinafter.

For instance, when the X-direction driven nut member 85x is moved rightward with respect to the view shown in FIG. 24 by the X-direction drive motor 170x, the first X-direction moving member 75 and the second X-direction moving member 76, which move integrally in a normal state, move relative to each other in the X-direction so as to disengage the movement limit lug 75a and the movement limit lug 76a (and also the movement limit lug 75b and the movement limit lug 76b) from each other against the biasing force of the extension joining spring 81x in the event of the X-direction moving stage 21 abutting against the Y-direction moving stage 71 upon reaching a mechanical limit of movement of the X-direction moving stage 21 or other causes which interfere with movement of the X-direction moving stage 21. Specifically, the second X-direction moving member 76 can solely move rightward in the X-direction relative to the first X-direction moving member 75 in the case where movement of the first X-direction moving member 75, together with the X-direction moving stage 21, is prevented for some reason. This structure makes it possible for the X-direction driven nut member 85x to move along the feed screw 171x even if the X-direction moving stage 21 becomes immobilized. This prevents excessive loads on the aforementioned driving force transfer mechanism, thus preventing thread jamming between the feed screw 171x and the X-direction driven nut member 85x and further preventing damage to other associated parts of the driving force transfer mechanism. When the X-direction driven nut member 85x is moved leftward with respect to the view shown in FIG. 24 by the X-direction drive motor 170x, the X-direction driven nut member 85x moves in a direction away from the nut contacting portion 76e, and accordingly, the driving force of the X-direction drive motor 170x does not act on either the first X-direction moving member 75 or the second X-direction moving member 76; hence, no undue loads are exerted on the driving force transfer mechanism even if movement of the X-direction moving stage 21 is prevented for some reason.

Similar to the driving mechanism for driving the CCD image sensor 6C in the X-direction, the driving mechanism for driving the CCD image sensor 60 in the Y-direction also has the capability of protecting itself from damage. This capability will be discussed hereinafter. For instance, when the Y-direction driven nut member 85y is moved upward with respect to the view shown in FIG. 24 by the Y-direction drive motor 170y, the Y-direction moving member 80 and the Y-direction moving stage 71, which move integrally in a normal state, move relative to each other in the Y-direction to disengage the movement limit lug 71c and the movement limit lug 80a (and also the movement limit lug 71d and the movement limit lug 80b) away from each other against the biasing force of the extension joining spring 81y in the event of the Y-direction moving stage 71 abutting against the stationary holder 23 upon reaching a mechanical limit of movement of the Y-direction moving stage 71 or other causes which interfere with movement of the Y-direction moving stage 71 (or the X-direction moving stage 21). Specifically, the Y-direction moving member 80 can solely move upward in the Y-direction relative to the Y-direction moving stage 71 in the case where movement of the Y-direction moving stage 71 is prevented for some reason. This structure makes it possible for the Y-direction driven nut member 85y to move along the feed screw 171y even if the Y-direction moving stage 71 becomes immobilized. This prevents excessive loads on the aforementioned driving force transfer mechanism, thus preventing thread jamming between the feed screw 171y and the Y-direction driven nut member 85y and further preventing damage to other associated parts of the driving force transfer mechanism. When the Y-direction driven nut member 85y is moved downward with respect to the view shown in FIG. 24 by the Y-direction drive motor 70y, the Y-direction driven nut member 85y moves in a direction away from the nut contacting portion 80e, and accordingly, the driving force of the Y-direction drive motor 170y does not act on either the Y-direction moving member 80 or the Y-direction moving stage 71; hence, no undue loads are exerted on the driving force transfer mechanism even if movement of the Y-direction moving stage 71 is prevented for some reason.

As mentioned above, the range of movement of the X-direction moving stage 21 is defined by inner peripheral surfaces of the Y-direction moving stage 71, while the range of movement of the Y-direction moving stage 71 is defined by inner peripheral surfaces of the stationary holder 23. Namely, the mechanical limits of movement of the X-direction moving stage 21 in the X-direction are defined by inner peripheral surfaces of the Y-direction moving stage 71, while the mechanical limits of movement of the Y-direction moving stage 71 in the Y-direction are defined by inner peripheral surfaces of the stationary holder 23. It is desirable that the driving force of the X-direction drive motor 170x be stopped being transferred from the feed screw 171x to the X-direction driven nut member 85x upon the X-direction moving stage 21 reaching either of the right and left limits of movement thereof, and that the driving force of the Y-direction drive motor 170y be stopped being transferred from the feed screw 171y to the Y-direction driven nut member 85y upon the Y-direction moving stage 71 reaching either of the upper and lower limits of movement thereof. However, taking manufacturing tolerances of the associated components into consideration, such an ideal correlation cannot be always achieved. For instance, if the X-direction driven nut member 85x and the feed screw 171x (or the Y-direction driven nut member 85y and the feed screw 171y) are still screw-engaged with each other by a sufficient axial length in a state where the X-direction moving stage 21 (or the Y-direction moving stage 71) has reached a mechanical limit of movement thereof, there will be a possibility of jamming occurring between the feed screw 171x and the X-direction driven nut member 85x (or the feed screw 171y and the Y-direction driven nut member 85y) due to loads placed on each of the X-direction driven nut member 85x and the feed screw 171x (or the Y-direction driven nut member 85y and the feed screw 171y) by a further rotation of the X-direction drive motor 170x (or the Y-direction drive motor 170y) if the image stabilizer of the digital camera 200 incorporates no damage-protection structure such as the above described damage-protection structure. To prevent this problem from occurring, the image stabilizing mechanism can be constructed so that the X-direction driven nut member 85x (the Y-direction driven nut member 85y) is disengaged from the feed screw 171x (171y) to come off upon reaching either end of the feed screw 171x (171y) after giving the X-direction driven nut member 85x (the Y-direction driven nut member 85y) a sufficient range of movement on the feed screw 171x (171y) so that the X-direction moving stage 21 (the Y-direction moving stage 71) cannot reach a mechanical limit of movement thereof easily. However, according to this structure, the range of movement of each of the X-direction moving stage 21 and the Y-direction moving stage 71 is required to be increased more than necessary, which may undesirably increase the size of the whole image stabilizer. Additionally, if the X-direction moving stage 21 or the Y-direction moving stage 71 is jammed accidentally at some middle point in the range of movement thereof (i.e., not at either end of the range of movement thereof), heavy loads are put on the screw-engaged portion between the X-direction driven nut member 85x (or the Y-direction driven nut member 85y) and the feed screw 171x (or 171y), regardless of the range of movement of the X-direction moving stage 21 or the Y-direction moving stage 71. Conversely, according to the above illustrated embodiment of the image stabilizer, a difference in amount of movement in the X-direction between the X-direction driven nut member 85x and the X-direction moving stage 21 is absorbed by intermediate members (i.e., the first X-direction moving member 75 and the second X-direction moving member 76), while a difference in amount of movement in the Y-direction between the Y-direction driven nut member 85y and the X-direction moving stage 21 is absorbed by intermediate members (i.e., the Y-direction moving stage 71 and the Y-direction moving member 80), and therefore, the range of movement of each of the X-direction moving stage 21 and the Y-direction moving stage 71 does not need to be increased more than necessary.

Moreover, even if the X-direction moving stage 21 or the Y-direction moving stage 71 is jammed accidentally at some middle point in the range of movement thereof (i.e., not at either end of the range of movement thereof) no heavy loads are applied on the screw-engaged portion between the X-direction driven nut member 85x (or the Y-direction driven nut member 85y) and the feed screw 171x (or 171y) because a difference in amount of movement in the X-direction between the X-direction driven nut member 85x and the X-direction moving stage 21 (or a difference in amount of movement in the Y-direction between the X-direction driven nut member 85y and the Y-direction moving stage 21) is absorbed by the aforementioned intermediate members (the first X-direction moving member 75 and the second X-direction moving member 76, or the Y-direction moving stage 71 and the Y-direction moving member 80). In the present embodiment of the image stabilizer, the maximum amount of relative movement between the first X-direction moving member 75 and the second X-direction moving member 76 is predetermined to be capable of absorbing any difference in amount of movement between the X-direction driven nut member 85x and the X-direction moving stage 21 wherever each of the X-direction driven nut member 85x and the X-direction moving stage 21 may be positioned in the range of movement thereof. Likewise, the maximum amount of relative movement between the Y-direction moving stage 71 and the Y-direction moving member 80 is predetermined to be capable of absorbing any difference in amount of movement between the Y-direction driven nut member 85y and the Y-direction moving stage 71 wherever each of the Y-direction driven nut member 85y and the Y-direction moving stage 71 may be positioned in the range of movement thereof.

A restriction on movement on the X-direction moving stage 21 or the Y-direction moving stage 71 is not the only cause of imposing loads on the driving force transfer mechanism. Since the CCD image sensor 60, that serves as an optical element for counteracting image shake, is supported to be freely movable in the X-direction and the Y-direction, there is a possibility of the X-direction moving stage 21 (which holds the CCD image sensor 60) or the Y-direction moving stage 71 (which holds the X-direction moving stage 21) being subjected to a force which forces the X-direction moving stage 21 or the Y-direction moving stage 71 to move even though no driving force is applied thereto by the X-direction drive motor 170x or the Y-direction drive motor 170y, respectively, in the case where a shock or sudden impact is applied to the digital camera 200 when the digital camera 200 is, e.g., dropped to the ground. Even in such a case, such loads, shock or sudden impact can be reliably absorbed in the present embodiment of the image stabilizer.

For instance, if the X-direction moving stage 21 is moved leftward with respect to the view shown in FIG. 24 by an external force other than the driving force of the X-direction drive motor 170x, the first X-direction moving member 75 is pressed in the same direction via the transfer roller 21c. Since this direction of pressing the first X-direction moving member 75 is a direction which disengages the movement limit legs 75a and 75b from the movement limit lugs 76a and 76b, respectively, the first X-direction moving member 75 can solely move leftward relative to the second X-direction moving member 76 against the biasing force of the extension joining spring 81x. During this movement, the first X-direction moving member 75 does not mechanically press the second X-direction moving member 76, so that only a resilient tensile force of the extension joining spring 81x acts on the second X-direction moving member 76, and accordingly, no excessive force is applied to the X-direction driven nut member 85x from the second X-direction moving member 76. If the X-direction moving stage 21 is moved rightward with respect to the view shown in FIG. 24 by an external force other than the driving force of the X-direction drive motor 170x, the X-direction moving stage 21 moves in a direction to disengage the transfer roller 21c from the linkage projection 75g, and either the first X-direction moving member 75 or the second X-direction moving member 76 is subjected to the moving force of the X-direction moving stage 21. Namely, even if the X-direction moving stage 21 is forced to move forward or reverse in the X-direction by an external force or the like when the X-direction drive motor 170x is not in operation, no undue loads are exerted on the screw-engaged portion between the X-direction driven nut member 85x and the feed screw 171x.

On the other hand, if the Y-direction moving stage 71 is moved downward with respect to the view shown in FIG. 24 by an external force other than the driving force of the Y-direction drive motor 170y, this moving direction of the Y-direction moving stage 71 is a direction which disengages the movement limit lugs 80a and 80b from the movement limit lugs 71c and 71d, respectively, and accordingly, the Y-direction moving stage 71 can solely move downward relative to the Y-direction moving member 80 against the biasing force of the extension joining spring 81y. During this movement, the Y-direction moving stage 71 does not mechanically press the Y-direction moving member 80, so that only a resilient tensile force of the extension joining spring 81y acts on the Y-direction moving member 80, and accordingly, no excessive force is applied to the Y-direction driven nut member 85y from the Y-direction moving member 80. If the X-direction moving stage 21 is moved upward with respect to the view shown in FIG. 24 by an external force other than the driving force of the X-direction drive motor 170x, the Y-direction moving member 80 is pressed upward via the engagement between the movement limit lug 80a and the movement limit lug 71c and the engagement between the movement limit lug 80b and the movement limit lug 71d. During this movement, the moving force of the Y-direction moving member 80 does not act on the Y-direction driven nut member 85y because this direction of movement of the Y-direction moving member 80 is a direction to disengage the nut contacting portion 80e from the Y-direction driven nut member 85y. Namely, even if the Y-direction moving stage 71 is forced to move forward or reverse in the Y-direction by an external force, or the like, when the Y-direction drive motor 170y is not in operation, no undue loads are exerted on the screw-engaged portion between the X-direction driven nut member 85y and the feed screw 171y.

As can be understood from the above description, according to the above illustrated embodiment of the image stabilizer, in either of the following two cases, i.e., the case where a malfunction occurs in the moving operation of the X-direction moving stage 21 and/or the Y-direction moving stage 71 when driven by the X-direction drive motor 170x or the Y-direction drive motor 170y; and the case where the X-direction moving stage 21 and/or the Y-direction moving stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are applied on either of the two screw-engaged portions between the X-direction driven nut member 85x and the feed screw 171x and between the Y-direction driven nut member 85y and the feed screw 171y, which produces a high degree of effectiveness of preventing each of these two screw-engaged portions from being damaged. Although it is possible to drive the X-direction moving stage 21 and the Y-direction moving stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 26:
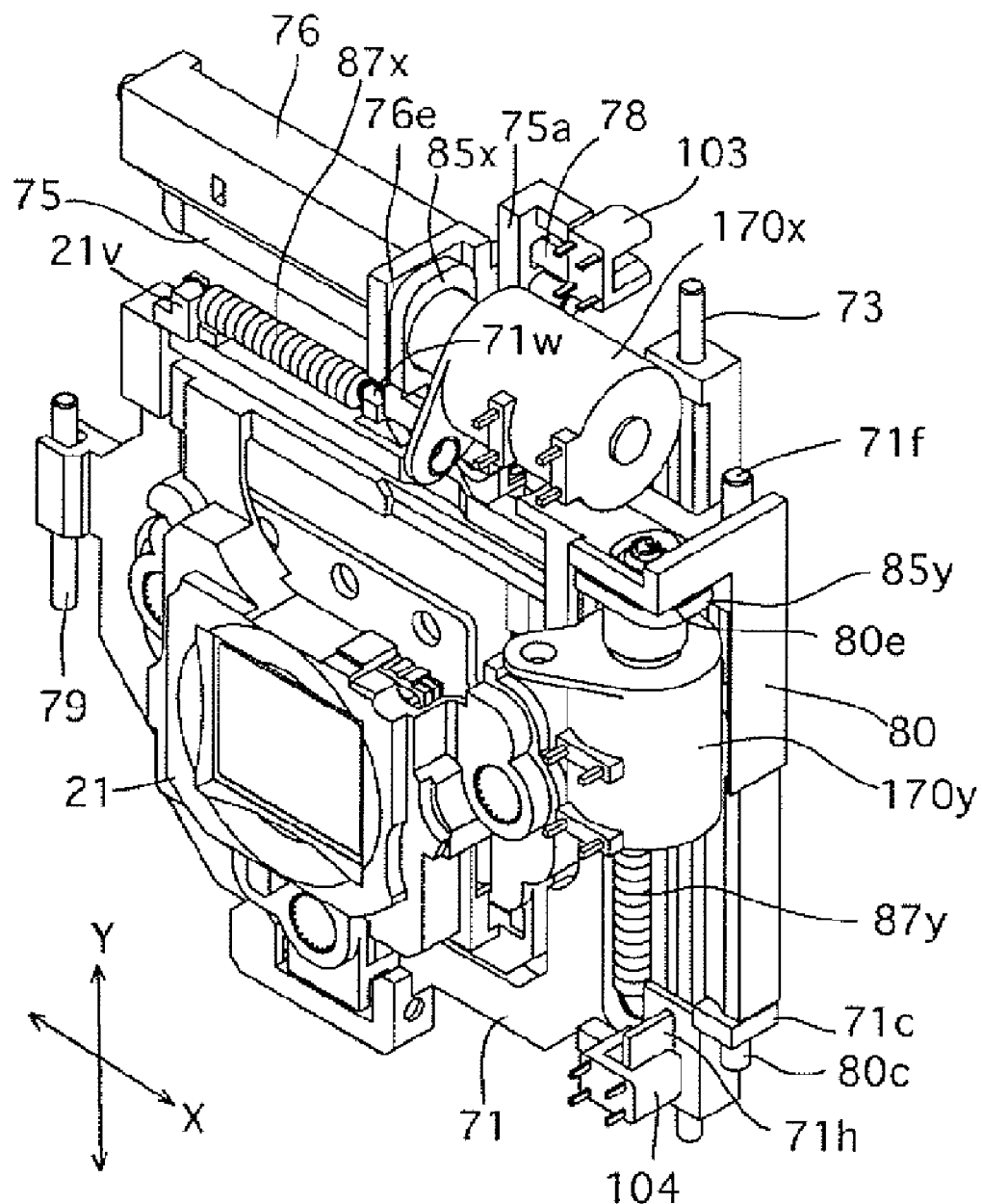
FIG. 26 is a view similar to that of FIG. 18, showing another embodiment (second embodiment) of the image stabilizing unit from which the stationary holder is removed.
Figure 27:
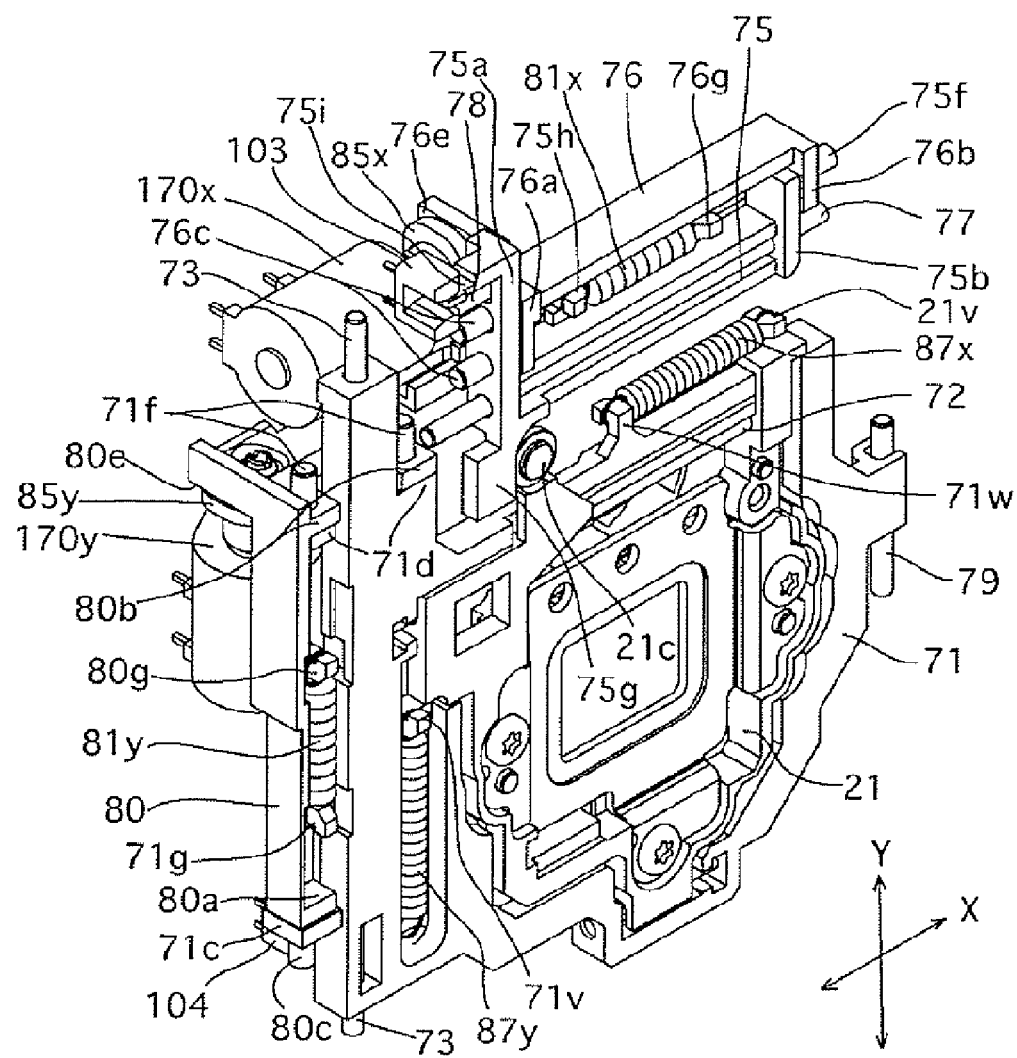
FIG. 27 is a rear perspective view of the elements of the image stabilizing unit shown in FIG. 26.
Figure 28:
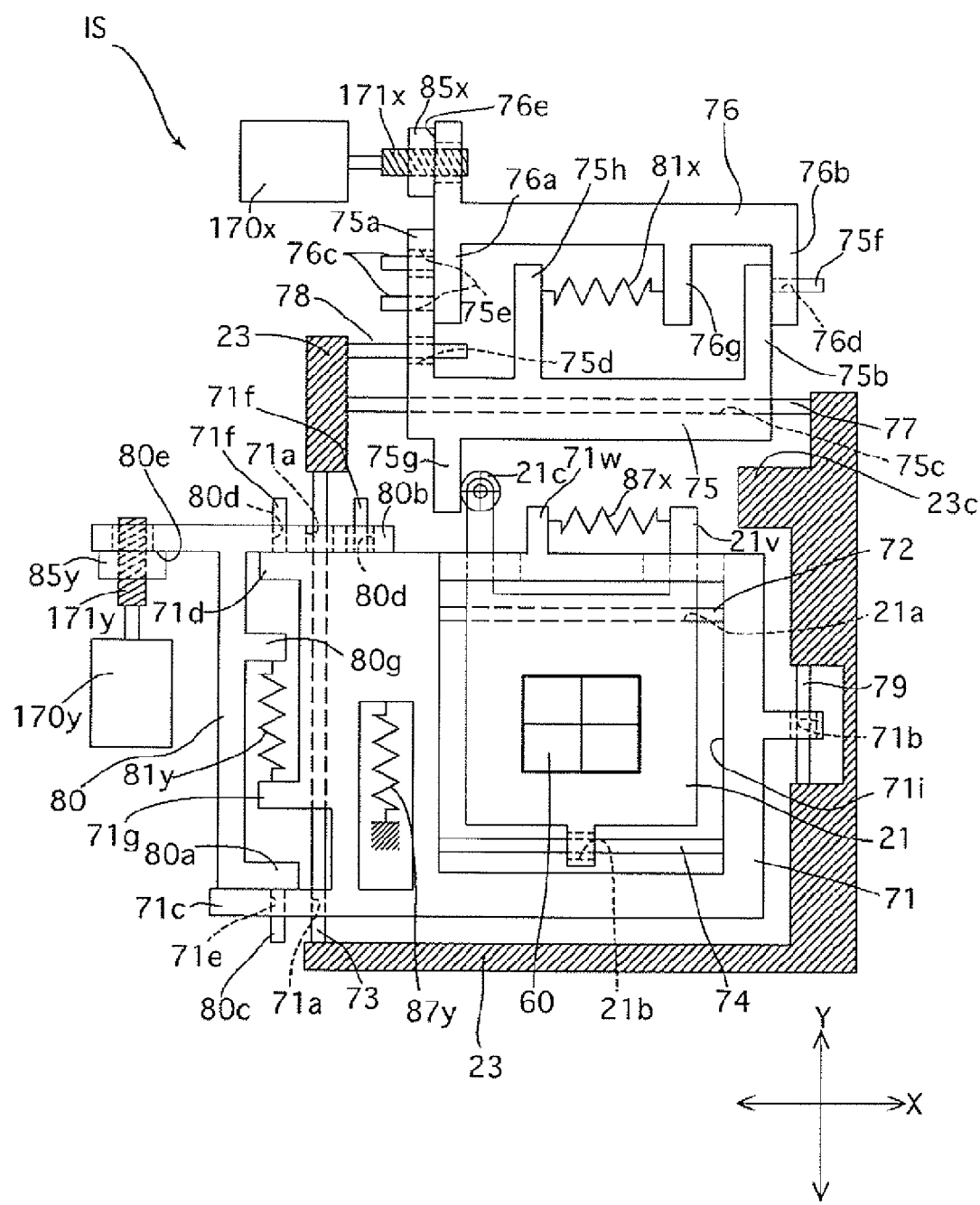
FIG. 28 is a diagrammatic illustration of the second embodiment of the image stabilizing unit, showing the structure thereof.

FIGS. 26 through 28 show second embodiment of the image stabilizing unit IS. In the second embodiment, the elements corresponding to those in the first embodiment of the image stabilizer IS are designated with like reference numerals. The second embodiment of the image stabilizing unit is the same as the first embodiment of the image stabilizing unit except that one end (left end as viewed in FIG. 28) of the X-direction stage biasing spring 87x is hooked on the Y-direction moving stage 71, not on the stationary holder 23. More specifically, the X-direction stage biasing spring 87x is extended so as to be installed between a spring hook 71w formed on the Y-direction moving stage 71 and the spring hook 21v of the X-direction moving stage 21. The same effect as that of the first embodiment of the image stabilizing unit can be obtained in the second embodiment of the image stabilizing unit.

As shown in the above descried embodiments, in the image stabilizer according to the present invention, the Y-direction moving stage (first stage/second moving member) 71 is mounted on the stationary holder 23 and supported thereby to be freely movable linearly in the Y-direction (first direction) in a plane orthogonal to the photographing optical axis Z1, the X-direction moving stage (second stage) 21 is mounted on the Y-direction moving stage 71 and supported thereby to be freely movable linearly in the X-direction (second direction) in the plane orthogonal to the photographing optical axis Z1, and the CCD image sensor (image-stabilizing optical element) 60 is mounted to the X-direction moving stage 21. As shown in FIGS. 24 and 28r the mechanical movement limits (horizontally opposite movement limits as viewed in FIGS. 24 and 28) of the X-direction moving stage 21 in the X-direction, which is guided in the X-direction by an X-direction guide device consisting of the pair of X-direction guide rods 72 and 74, are defined by inner peripheral surfaces of the Y-direction moving stage 71, and the mechanical movement limits (vertically opposite movement limits as viewed in FIGS. 24 and 28) of the Y-direction moving stage 71 in the Y-direction, which is guided in the Y-direction by a Y-direction guide device consisting of the pair of Y-direction guide rods 73 and 79, are defined by inner peripheral surfaces of the stationary holder 23. The range of movement of the X-direction moving stage 21 during an image stabilizing operation when the main switch 101 is ON is defined by control of the control circuit 102 so that the X-direction moving stage 21 does not reach either of such mechanical movement limits thereof, while the range of movement of the Y-direction moving stage 71 during an image stabilizing operation when the main switch 101 is ON is defined by control of the control circuit 102 so that the Y-direction moving stage 71 does not reach either of such mechanical movement limits thereof. Namely, the control circuit (drive controller) 102 supplies a driving signal for correction of image shake to each of the X-direction drive motor 170x and the Y-direction drive motor 170y to move the X-direction moving stage 21 within an image-stabilizing movement range (a predetermined middle range in which the X-direction moving stage 21 does not reach either of the opposite mechanical movement limits thereof) narrower than the mechanical movement limits of the X-direction moving stage 21 and to move the Y-direction moving stage 71 within an image-stabilizing movement range (a predetermined middle range in which the Y-direction moving stage 71 does not reach either of the opposite mechanical movement limits thereof) narrower than the mechanical movement limits of the Y-direction moving stage 71.

Immediately after the main switch 101 is turned OFF (i.e., the power is turned OFF) so as to operate the digital camera so as to move from a ready-to-photograph state (operating state/image stabilizing state) to a non-photograph state (non-operating state), the control circuit 102 controls the operation of a Y-direction driving device (first driving device) including of the Y-direction drive motor 170y, the feed screw 171y, the Y-direction driven nut member 85y and the Y-direction moving member (first moving member) 80 so that the Y-direction moving stage 71 moves to a movement limit (standby position) thereof via the pair of Y-direction guide rods 73 and 79 beyond the range of movement of the Y-direction moving stage 71 for correction of image shake.

Figure 29:
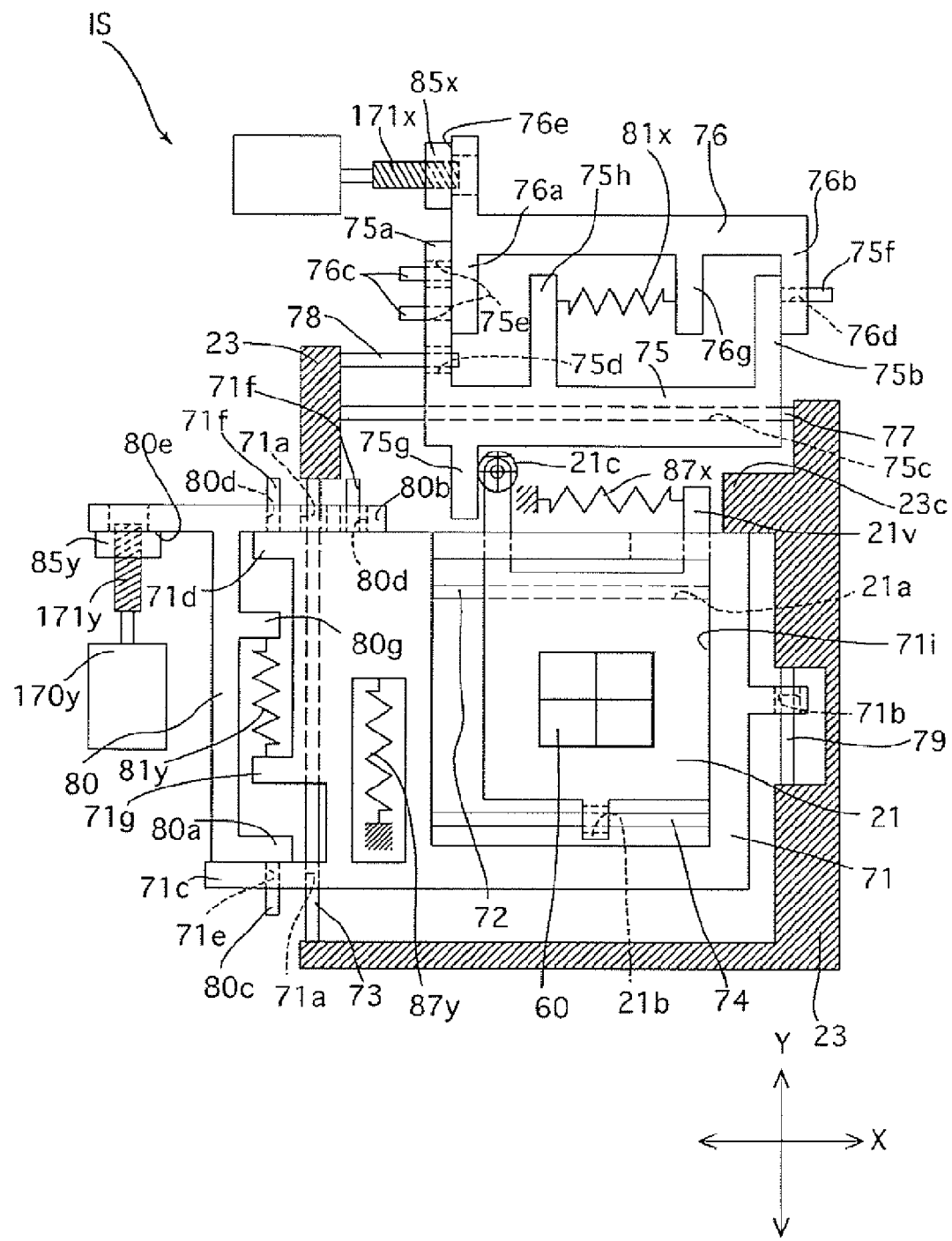
FIG. 29 is a view similar to that of FIG. 24, showing a state where the X-direction moving stage and the Y-direction moving stage of the image stabilizing unit shown in FIG. 24 have been moved to the respective standby positions thereof upon the main switch of the digital camera being turned OFF.

More specifically, the control circuit 102 controls the operation of the Y-direction drive motor 170y so that the Y-direction moving stage 71 moves to the upper movement limit thereof (as viewed in FIG. 29) at which the Y-direction moving stage 71 comes in contact with a stop projection 23c which projects from the stationary holder 23 as shown in FIG. 29. The control circuit 102 also controls the operation of an X-direction driving device (second driving device) including the X-direction drive motor 170x, the feed screw 171x, the X-direction driven nut member 85x, the second X-direction moving member (first moving member) 76 and the X-direction moving member (second moving member) 75 so that the X-direction moving stage 21 moves to a movement limit (standby position) thereof via the pair of X-direction guide rods 72 and 74 beyond the range of movement of the X-direction moving stage 21 for correction of image shake. More specifically, the control circuit 102 controls the operation of the X-direction drive motor 170x so that the X-direction moving stage 21 moves to the right movement limit thereof (as viewed in FIG. 29; the left limit as viewed from the front of the digital camera 200) at which the X-direction moving stage 21 comes in contact with a stop surface 71i of the Y-direction moving stage 71.

The control circuit 102 stops the rotation of the X-direction drive motor 170x and the Y-direction drive motor 170y immediately after the X-direction moving stage 21 and the Y-direction moving stage 71 reach the aforementioned movement limits (standby positions) thereof, respectively. Thereupon, the X-direction moving stage 21 is locked in the X-direction while the Y-direction moving stage 71 is locked in the Y-direction, so that both the X-direction moving stage 21 and the Y-direction moving stage 71 are stably held with no fear of accidental movement. In this manner, moving the X-direction moving stage 21 and the Y-direction moving stage 71 to the respective movement limits (standby positions) thereof makes it possible to lock the X-direction moving stage 21 and the Y-direction moving stage 71 when the digital camera 200 is not in use without requiring an independent lock mechanism. Additionally, since the X-direction moving stage 21 and the Y-direction moving stage 71 can be locked without requiring electric current to be passed through either of the X-direction drive motor 170x and the Y-direction drive motor 170y after having been moved to the standby positions of the X-direction moving stage 21 and the Y-direction moving stage 71, respectively, no excessive power is consumed. Although the tension structure for the installation of the X-direction moving stage biasing spring 87x shown in FIG. 29 corresponds to that of the first embodiment of the image stabilizing unit shown in FIG. 24, the X-direction moving stage 21 and the Y-direction moving stage 71 can be moved to respective movement limits thereof to be locked upon the power being turned OFF likewise with the case shown in FIG. 29 in the second embodiment of the image stabilizing unit shown in FIG. 28.

Figure 30:
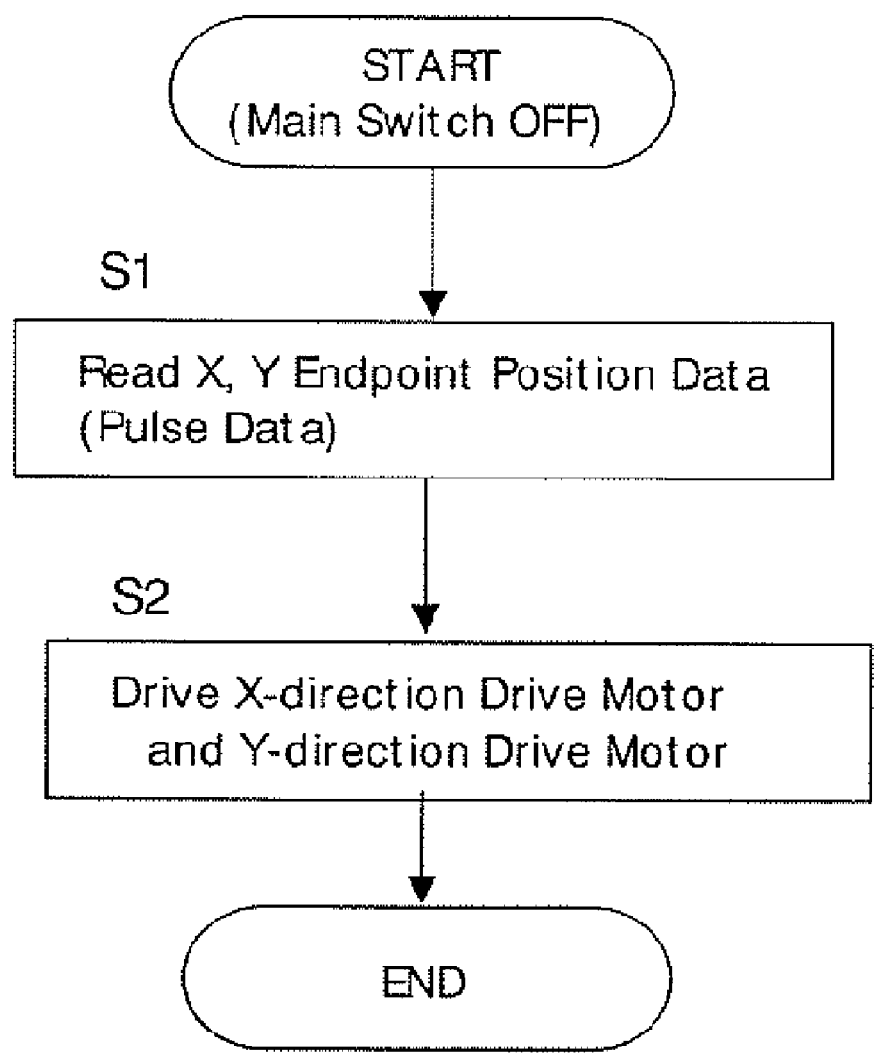
FIG. 30 is a flow chart showing control for moving the X-direction moving stage and the Y-direction moving stage to the respective standby positions thereof upon the main switch of the digital camera being turned OFF.

This control when the power is turned OFF will be discussed hereinafter. As a precondition of this control, endpoint position data (standby position drive data) for moving the X-direction moving stage 21 to the right movement limit (standby position) thereof as viewed in FIG. 29 and endpoint position data (standby position drive data) for moving the Y-direction moving stage 71 to the upper movement limit (standby position) thereof as viewed in FIG. 29 are written in advance as pulse data for the X-direction drive motor 170x and pulse data for the Y-direction drive motor 170y in an EEPROM (memory) 110 (see FIG. 25), respectively. For instance, the pulse data for the X-direction drive motor 170x can be set as driving pulses from the initial position of the X-direction moving stage 21 that is detected by the first photo-interrupter 103, and the pulse data for the Y-direction drive motor 170y can be set as driving pulses from the initial position of the Y-direction moving stage 71 that is detected by the second photo-interrupter 104. Upon the main switch 101 being turned OFF, control enters the flow chart shown in FIG. 30. Firstly, the aforementioned endpoint position data (standby position drive data) for moving the X-direction moving stage 21 and the Y-direction moving stage 71 are read out from the EEPROM 110 to be input to the control circuit 102 at step S1. Subsequently, based on the endpoint position data, the control circuit 102 drives each of the X-direction drive motor 170x and the Y-direction drive motor 170y by a predetermined number of pulses via a motor driver which is provided in the control circuit 102. Thereupon, the X-direction moving stage 21 and the Y-direction moving stage 71 reach the respective movement limits (standby positions) thereof to be held thereat as shown in FIG. 29.

In the above described embodiments of the image stabilizing units, a driven member which is driven in the Y-direction by the Y-direction drive motor 170y includes two components, i.e., the Y-direction moving member (first moving member) 80 and the Y-direction moving stage (second moving member) 71, and an escape recess for the Y-direction moving stage 71, which is utilized in the event of an excessive force being exerted on the Y-direction moving stage 71, can be configured by connecting the Y-direction moving member 80 and the Y-direction moving stage 71 to each other resiliently via the extension joining spring 81y. Namely, when the Y-direction moving stage 71 is driven to the movement limit thereof determined by the stop projection 23c of the stationary holder 23 in response of a change of the main switch 101 from the ON state to the OFF state, the Y-direction driving device is not damaged even if the amount of driving of the Y-direction moving stage 71 to the movement limit thereof determined by the stop projection 23c is excessive to some degree, which makes it easy for the control circuit 102 to control the driving of the Y-direction moving stage 71. In addition, in the case where a force which makes the Y-direction moving stage 71 move in the opposite direction (downward as viewed in FIG. 29) from the movement limit of the Y-direction moving stage 71 shown in FIG. 29 is exerted on the Y-direction moving stage 71, the Y-direction moving stage 71 moves if the force is sufficiently great to move the Y-direction moving stage 71 against the spring force of the extension joining spring 81y. However, the spring force of the extension joining spring 81y is greater than the spring force of the Y-direction moving stage biasing spring 87y, and this strong spring force of the extension joining spring 81y makes it possible to hold the Y-direction moving stage 71 at a movement limit thereof as shown in FIG. 29 with stability. In other words, in the structure having two biasing devices, i.e., the extension joining spring 81y and the Y-direction moving stage biasing spring 87y, the Y-direction moving stage 71 can be moved smoothly and held stably at a movement limit thereof by moving the Y-direction moving stage 71 in a direction against the biasing force of the Y-direction moving stage biasing spring 87y, which has a relatively weak spring force, when the main switch 101 is turned OFF. However, alternatively, in the Y-direction driving mechanism of the image stabilizing unit IS, the Y-direction moving stage 71 and the Y-direction moving member 80 can be formed integral with each other.

In the above described embodiments of the image stabilizing units, a driven member which is driven in the X-direction by the X-direction drive motor 170x includes two components, i.e., the X-direction moving member (second moving member) 75 and the X-direction moving member (first moving member) 76, and an escape recess for the X-direction moving stage 21 which is used in the event of an excessive force being exerted on the X-direction moving stage 21 can be configured by connecting the X-direction moving member 75 and the X-direction moving member 76 to each other resiliently via the extension joining spring 81x. Namely, when the X-direction moving stage 21 is driven to the movement limit thereof determined by the stop surface 71i of the Y-direction moving stage 71 in response of a change of the main switch 101 from the ON state to the OFF state, the X-direction driving device is not damaged even if the amount of driving of the X-direction moving stage 21 to the movement limit thereof determined by the stop surface 71i is excessive to some degree, which makes it easy for the control circuit 102 to control the driving of the X-direction moving stage 21. In addition, in the case where a force which makes the X-direction moving stage 21 move in the opposite direction (leftward as viewed in FIG. 29) from the movement limit of the X-direction moving stage 21 shown in FIG. 29 is exerted on the X-direction moving stage 21, the X-direction moving stage 21 moves if the force is sufficiently great to move the X-direction moving stage 21 against the spring force of the extension joining spring 81x. However, the spring force of the extension joining spring 81x is greater than the spring force of the X-direction moving stage biasing spring 87x, and this strong spring force of the extension joining spring 81x makes it possible to hold the X-direction moving stage 21 at a movement limit thereof as shown in FIG. 29 with stability. In other words, in the structure having two biasing devices, i.e., the extension joining spring 81x and the X-direction moving stage biasing spring 87x, the X-direction moving stage 21 can be moved smoothly and held stably at a movement limit thereof by moving the X-direction moving stage 21 in a direction against the biasing force of the X-direction moving stage biasing spring 87x, which has a relatively weak spring force, when the main switch 101 is turned OFF. However, alternatively, in the X-direction driving mechanism of the image stabilizing unit IS, the X-direction moving member 75 and the X-direction moving member 76 can be formed integral with each other.

Substantially the same effect can be obtained even it the standby positions for the X-direction moving stage 21 and the Y-direction moving stage 71, to which the X-direction moving stage 21 and the Y-direction moving stage 71 are moved upon the power being turned OFF, are set at positions slightly away from the upper mechanical movement limit and the right mechanical movement limit as viewed in FIG. 29, respectively. For instance, in regard to the X-direction moving stage 21, instead of having a mechanical movement limit at which the X-direction moving stage 21 comes in contact with an inner surface of the Y-direction moving stage 71, a position in the close vicinity of this mechanical movement limit of the X-direction moving stage 21 can be set as a stop position (standby position) at which the X-direction moving stage 21 stops upon the power being turned OFF. Similarly, in regard to the Y-direction moving stage 71, instead of having a mechanical movement limit at which the Y-direction moving stage 71 comes in contact with an inner surface of the stationary holder 23, a position in the close vicinity of this mechanical movement limit of the Y-direction moving stage 71 can be set as a stop position (standby position) at which the Y-direction moving stage 71 stops upon the power being turned OFF. Even if the X-direction moving stage 21 is stopped with a slight gap remaining between the X-direction moving stage 21 and a mechanical movement limit thereof, and the Y-direction moving stage 71 is stopped with a slight gap remaining between the Y-direction moving stage 71 and a mechanical movement limit thereof, the X-direction driving mechanism and the Y-direction driving mechanism of the image stabilizing unit IS can be prevented from becoming damaged when the power of the digital camera 200 is turned OFF because the amount of play between the X-direction moving stage 21 and a mechanical movement limit thereof, and the amount of play between the Y-direction moving stage 71 and a mechanical movement limit thereof, respectively, are minimal.

In this case, instead of the value of the aforementioned endpoint position date for the X-direction moving stage 21 (the amount of driving of the X-direction drive motor 170x for moving the X-direction moving stage 21 to the mechanical right movement limit thereof as viewed in FIG. 29), a value with which the X-direction moving stage 21 can be stopped moving at a position in the close vicinity of such a mechanical movement limit can be adopted as the value of the aforementioned pulse data (standby position drive data) for the X-direction drive motor 171x that is stored in the EEPROM 110; and similarly, instead of the value of the aforementioned endpoint position data for the Y-direction moving stage 71 (the amount of driving of the Y-direction drive motor 170y for moving the Y-direction moving stage 71 to the mechanical upper movement limit thereof as viewed in FIG. 29), a value with which the Y-direction moving stage 71 can be stopped moving at a position in the close vicinity of such a mechanical movement limit can be adopted as the value of the aforementioned pulse data (standby position drive data) for the Y-direction drive motor 170y that is stored in the EEPROM 110.

Although the present invention has been described based on the above illustrated embodiments, the present invention is not limited solely to these particular embodiments. For instance, although the above described embodiment of the image stabilizer is configured as an image stabilizer for a digital camera, the image stabilizer according to the present invention can be applied to not only a camera but also any other optical devices such as binoculars.

Although the CCD image sensor 60 is driven to correct image shake in the above illustrated embodiments, an optical element which is driven at a time of correcting image shake is not limited solely to such an image sensor; a lens group can be alternatively driven to correct image shake.

Although the X-direction moving stage 21 and the Y-direction moving stage 71 are moved to their respective standby positions (movement limits or in the close vicinity thereof) in the X-Y directions that are orthogonal to each other, respectively, in the above illustrated embodiments, it is possible for only one of the X-direction moving stage 21 and the Y-direction moving stage 71 to be moved to the standby position (a movement limit or in the close vicinity thereof) thereof.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image stabilizer comprising:
   a guide device which guides an image-stabilizing optical element in a manner to allow said image-stabilizing optical element to move in a plane orthogonal to an optical axis, said guide device including at least one mechanical movement limit which prevents movement of said image-stabilizing optical element in a guide direction;
   a driving device which moves said image-stabilizing optical element in said plane; and
   a drive controller which controls said driving device to move said image-stabilizing optical element within an image-stabilizing movement range so as not to reach said mechanical movement limit for correction of image shake during an image stabilizing operation, and which controls said driving device to move said image-stabilizing optical element to a standby position located outside of said image-stabilizing movement range in said guide direction, when said image stabilizer changes from an operating state to a non-operating state.

2. The image stabilizer according to claim 1, wherein said standby position of said image-stabilizing optical element corresponds to said mechanical movement limit.

3. The image stabilizer according to claim 1, wherein said standby position of said image-stabilizing optical element is adjacent to said mechanical movement limit so as to be located closer to said mechanical movement limit than said image-stabilizing movement range.

4. The image stabilizer according to claim 1, further comprising a biasing device which biases said image-stabilizing optical element in one of opposite directions of movement thereof in said plane, wherein said drive controller moves said image-stabilizing optical element to said standby position in a direction opposite to a biasing direction of said biasing device when said image stabilizer changes from said operating state to said non-operating state.

5. The image stabilizer according to claim 4, wherein said driving device comprises:

a drive source;

a first moving member which is movable along a guide direction of said guide device by said drive source;

a second moving member which is guided along said guide direction and movable relative to said first moving member, wherein said second moving member applies a moving force to said image-stabilizing optical element; and a second biasing device which biases said second moving member in a direction opposite to said biasing direction of said biasing device with a biasing force greater than a biasing force of said biasing device.

6. The image stabilizer according to claim 1, wherein said guide device comprises;

a first moving stage supported by a stationary member thereon to be movable linearly in a first direction in a plane which is orthogonal to said optical axis; and a second moving stage supported by said first moving stage thereon to be movable linearly in a second direction orthogonal to said first direction in a plane which is orthogonal to said optical axis, wherein said image-stabilizing optical element is mounted on said second moving stage, wherein said driving device comprises:

a first driving device which moves said first moving stage forward and reverse in said first direction; and a second driving device which moves said second moving stage forward and reverse in said second direction, and wherein said drive controller moves said first moving stage and said second moving stage to respective standby positions thereof so that said image-stabilizing optical element is positioned at said standby position thereof.

7. The image stabilizer according to claim 1, further comprising a memory in which standby position drive data indicating an amount of driving of said image-stabilizing optical element to said standby position by said driving device is stored, wherein said drive controller moves said image-stabilizing optical element via said driving device based on said standby position drive data read out from said memory when said image stabilizer changes from said operating state to said non-operating state.

8. The image stabilizer according to claim 7, wherein said driving device comprises a stepping motor, and wherein said standby position drive data comprises pulse data for said stepping motor.

9. The image stabilizer according to claim 1, wherein said image stabilizer is incorporated in a digital camera, and wherein said image-stabilizing optical element comprises one of an image pickup device and a lens group.

10. An image stabilizer comprising:

an image-stabilizing optical element which is movable in a plane orthogonal to an optical axis within a mechanical operating range of movement; and a driving device which moves said image-stabilizing optical element in accordance with a driving signal for correction of image shake in said plane within a middle range of movement for correction of image shake which is defined within said mechanical operating range of movement by said driving signal, wherein said driving device is controlled to move said image-stabilizing optical element to a standby position which is located outside of said middle range of movement for correction of image shake and which is closer to one of opposite ends of said mechanical operating range of movement than said middle range of movement for correction of image shake when said image stabilizer changes from a ready-to-photograph state to a non-photograph state.

* * * * *